United States Patent
Wustoni et al.

(10) Patent No.: US 12,292,406 B2
(45) Date of Patent: May 6, 2025

(54) DEVICE FOR DETECTING ANALYTES IN A SAMPLE, AND METHODS OF USE THEREOF

(71) Applicant: King Abdullah University of Science and Technology, Thuwal (SA)

(72) Inventors: Shofarul Wustoni, Thuwal (SA); Sahika Inal, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 470 days.

(21) Appl. No.: 17/632,613

(22) PCT Filed: Aug. 3, 2020

(86) PCT No.: PCT/IB2020/057339
§ 371 (c)(1),
(2) Date: Feb. 3, 2022

(87) PCT Pub. No.: WO2021/024168
PCT Pub. Date: Feb. 11, 2021

(65) Prior Publication Data
US 2022/0283116 A1    Sep. 8, 2022

Related U.S. Application Data

(60) Provisional application No. 62/985,015, filed on Mar. 4, 2020, provisional application No. 62/882,481, filed on Aug. 3, 2019.

(51) Int. Cl.
*G01N 27/414*    (2006.01)
*G01N 27/31*    (2006.01)
(Continued)

(52) U.S. Cl.
CPC ........ *G01N 27/4145* (2013.01); *G01N 27/31* (2013.01); *G01N 27/327* (2013.01); *G01N 27/3335* (2013.01); *G01N 27/44726* (2013.01)

(58) Field of Classification Search
CPC .. G01N 27/4145; G01N 27/31; G01N 27/327; G01N 27/3335; G01N 27/44726
See application file for complete search history.

(56) References Cited

U.S. PATENT DOCUMENTS 9,530,976 B2    12/2016    Ferro
9,914,099 B2    3/2018    Peinemann
(Continued)

FOREIGN PATENT DOCUMENTS

CN    107525833 A  *  12/2017    ......... G01N 27/3275
WO    2011022121 A2    2/2011
(Continued)

OTHER PUBLICATIONS

Ke et al., English translation of CN107525833A, 2017 (Year: 2017).*
(Continued)

*Primary Examiner* — Luan V Van
*Assistant Examiner* — Shizhi Qian
(74) *Attorney, Agent, or Firm* — PABST PATENT GROUP LLP

(57) ABSTRACT

Devices for detecting an analyte in a sample suspected of containing the analyte, are provided. The devices include bio-functional, nanostructured, isoporous membranes (BNIM) integrated organic electrochemical transistor (OECT), herein BNIM-OECT, for the rapid and sensitive detection of the presence of an analyte of interest, in a sample, for example, a biological sample. The membrane (i.e., BNIM) is physically separated from the OECT channel therefore the electronic device can be used multiple times.

(Continued)

The isoporous membrane is functionalized to include a binding partner for the analyte being detected. The BNIM-OECT can be used for disease detection, by functionalizing the BNIM-OECT with a binding partner to an analyte associated with the disease, applying a collected biological sample to the BNIM-OECT. A decrease in channel current as a result of analyte binding to its binding partner on the isoporous membrane indicates the presence of the analyte in the sample.

19 Claims, 13 Drawing Sheets

(51) Int. Cl.
  *G01N 27/327* (2006.01)
  *G01N 27/333* (2006.01)
  *G01N 27/447* (2006.01)

(56) References Cited

U.S. PATENT DOCUMENTS

| | | | |
|---|---|---|---|
| 2012/0078072 | A1 | 3/2012 | Roesicke et al. |
| 2012/0143027 | A1 | 6/2012 | Phillips et al. |
| 2014/0217012 | A1 | 8/2014 | Wiesner |
| 2016/0338626 | A1 | 11/2016 | Wang et al. |
| 2019/0331673 | A1 | 10/2019 | Torsi et al. |
| 2020/0033291 | A1 | 1/2020 | Tarasov et al. |
| 2020/0072786 | A1* | 3/2020 | Pierre ............... H03F 3/45475 |
| 2020/0238227 | A1* | 7/2020 | Dorin ..................... C08J 9/283 |
| 2022/0276199 | A1* | 9/2022 | Shirinskaya ....... G01N 27/4145 |

FOREIGN PATENT DOCUMENTS

| | | |
|---|---|---|
| WO | 2013082600 | 6/2013 |
| WO | 2014096407 A1 | 6/2014 |
| WO | 2017206415 A1 | 12/2017 |
| WO | 2018048742 A1 | 3/2018 |
| WO | 2019023135 | 1/2019 |
| WO | 2019142146 | 7/2019 |
| WO | 2021024168 A1 | 2/2021 |
| WO | 2021130525 A1 | 7/2021 |
| WO | 2022003651 A1 | 1/2022 |

OTHER PUBLICATIONS

Tao et al., English translation of CN107525833A, 2017 (Year: 2017).*
Hideshima et al., Effect of human serum on the electrical detection of amyloid-fibrils in biological environments using azo-dye immobilized field effect transistor (FET) biosensor, Sensing and biosensing research, 2018, 17, 25-29 (Year: 2018).*
Dapson, Amyloid from a histochemical perspective. A review of the structure, properties and types of amyloid, and a proposed staining mechanism for Congo red staining, Biotechnic & Histochemistry, 2018, 93, 543-556 (Year: 2018).*
Rahimi, Aptamers selected for recognizing amyloid-protein-A case for cautious optimism, Int. Journal of Molecular Sciences, 2018, 19, 668 (Year: 2018).*
Hydrogel_wiki, https://en.wikipedia.org/wiki/Hydrogel, 2024 (Year: 2024).*
Hu et al., A novel and sensitive sarcosine biosensor based on organic electrochemical transistor, Electrochimica Acta, 2019, 307, 100-106 (Year: 2019).*
Tao et al., A sensitive DNA sensor based on an organic electrochemical transistor using a peptide nucleic acid-modified nanoporous gold gate electrode, RCS Advances, 2017, 7, 52118 (Year: 2017).*
International Search Report received for PCT Patent Application No. PCT/IB2019/050443, mailed on May 9, 2019, 4 pages.
International Search Report received for PCT Patent Application No. PCT/IB2019/053496, mailed on Aug. 13, 2019, 4 pages.
International Search Report received for PCT Patent Application No. PCT/IB2021/055981, mailed on Oct. 19, 2021, 5 pages.
International Search Report received for PCT Patent Application No. PCT/IB2022/061164, mailed on Mar. 3, 2023, 6 pages.
Bihar , et al., "A fully inkjet-printed disposable glucose sensor on paper", npj Flexible Electronics, vol. 2, No. 30, 2018, pp. 1-8.
Bihar, Eloïse , "Inkjet printed organic electronic devices for biomedical diagnosis", These de doctorat, Universite de Lyon, 2016, pp. 1-132.
Duznovic , et al., "Ultrasensitive and Selective Protein Recognition with Nanobody-Functionalized Synthetic Nanopores", Small., vol. 17, No. 33; e2101066, Aug. 2021, 9 pages.
Fahlman , et al., "Interfaces in organic electronics", Nature Reviews Materials, vol. 4, No. 10, 2019, pp. 627-650.
Giovannitti , et al., "N-type organic electrochemical transistors with stability in water", Nature Communications, vol. 7, No. 1, Oct. 7, 2016, 10 pages.
Guo , et al., "Rapid single-molecule detection of COVID-19 and MERS antigens via nanobodyfunctionalized organic electrochemical transistors", Nature Biomedical Engineering, vol. 5, No. 7, 2021, pp. 666-667.
Katz, Howard E, "Antigen sensing via nanobody-coated transistors", Nat Biomed Eng., vol. 5, No. 7, Jul. 2021, pp. 639-640.
Kaziz , et al., "Enhancement of COVID-19 detection time by means of electrothermal force", Microfluid Nanofluidics., vol. 25, No. 10; 86, 2021, 12 pages.
Maattanen , et al., "A low-cost paper-based inkjet-printed platforn1 for electrochemical analyses", Sensors and Actuators B, vol. 177, Feb. 2013, pp. 153-162.
Macchia , et al., "Organic electrochemical transistor immuno-sensor operating at the femto-molar limit of detection", 7th IEEE International Workshop on Advances in Sensors and Interfaces (IWASI), IEEE, 2017, pp. 68-72.
Oh , et al., "Recent advances in chemical functionalization of nanoparticles with biomolecules for analytical applications", Analytical and Bioanalytical Chemistry, vol. 407, No. 29, 2015, pp. 8627-8645.
Pappa , et al., "Organic Transistor Arrays Integrated with Finger-Powered Microfluidics for Multianalyte Saliva Testing", Advanced Healthcare Materials, vol. 5, No. 17, Sep. 7, 2016, pp. 2295-2302.
Pu, et al., "Cylindrical Electrochemical Sensor Fabricated by Rotated Inkjet Printing on Flexible Substrate for Glucose Monitoring", 19th International Conference on Solid-State Sensors, Actuators and Microsystems (Transducers), Jun. 2017, pp. 1241-1244.
Sun , et al., "Complementary Logic Circuits Based on High-Performance n-Type Organic Electrochemical Transistors", Advanced Materials, vol. 30, No. 9: 1704916, Jan. 10, 2018, 7 pages.
Torricelli, Fabrizio , "Enhanced multifunctional bioelectronics with integrated organic electrochemical transistor architectures", Progress in Biomedical Optics and Imaging, SPIE-International Society for Optical Engineering, vol. 11663, Mar. 5, 2021, pp. 116630P-1-116630P-13.
Tortorich , et al., "Inkjet-Printed and Paper-Based Electrochemical Sensors", Applied Science, vol. 8, No. 288, 2018, pp. 1-16.
Alzheimer's Diseases International, World Alzheimer Report 2018, "The Sstate of the art of dementia research: New frontiers", https://www.alz.co.uk/research/WorldAlzheimerReport2018.pdf?2, accessed on Mar. 13, 2019.
Baltzer, "Crossing borders to bind proteins—a new concept in protein recognition based on the conjugation of small organic molecules or short peptides to polypeptides from a designed set." Anal Bioanal Chem. 400(6):1653-64 (2011).
Barr, An XPS study of Si as it occurs in adsorbents, catalysts, and thin films, Appl. Surf. Sci. 15 (1), 1-35 (1983).
Camalli, et al. "Adducts of tin(IV) and organotin(IV) derivatives with 2,2'-azopyridine II. Crystal and molecular structure of SnMe2Br2AZP and further mössbauer and photoelectronic spectroscopic studies" Inorganica Chimica Acta 170(2):225-231 (1990).
Cardoso, et al. "Novel and simple electrochemical biosensor monitoring attomolar levels of miRNA-155 in breast cancer." Biosens Bioelectron. 2016 vol. 80: pp. 621-630. doi: 10.1016/j.bios.2016.02.035.

(56) References Cited

OTHER PUBLICATIONS

Dalal, et al. "Nanoscale Fluorescence Imaging of Single Amyloid Fibrils." J Phys Chem Lett. 2012 vol. 3(13):pp. 1783-1787. doi: 10.1021/jz300687f.

De La Escosura-Muñiz, et al. "Alzheimer's disease biomarkers detection in human samples by efficient capturing through porous magnetic microspheres and labelling with electrocatalytic gold nanoparticles" Biosens Bioelectron 67: 162-9 (2015).

Erali, et al. "Localization and imaging of nucleic acids on nanoporous aluminum oxide membranes." Clin Chem. 50(10):1819-21 (2004).

Fu, et al. "Highly Sensitive Detection of Protein Biomarkers with Organic Electrochemical Transistors", Adv. Mater., 29(41) (2017).

Furneaux, et al. "The formation of controlled-porosity membranes from anodically oxidized aluminium." Nature 337:147-149 (1989).

Galanina, et al. "Carbohydrate-based probes for detection of cellular lectins." Anal Biochem. 265(2):282-9 (1998).

Ghittorelli, et al. "High-sensitivity ion detection at low voltages with current-driven organic electrochemical transistors." Nat Commun. 2018 vol. 9(1):1441. doi: 10.1038/s41467-018-03932-3.

Gualandi, et al. "Selective detection of dopamine with an all PEDOT:PSS Organic Electrochemical Transistor." Sci Rep. 2016 vol. 6:35419. doi: 10.1038/srep35419.

Hardy, et al. "The amyloid hypothesis of Alzheimer's disease: progress and problems on the road to therapeutics." Science. vol. 297(5580): pp. 353-356 (2002).

He, et al. "Detection of bacteria with organic electrochemical transistors." Journal of Materials Chemistry, 22(41):22072-22076 (2012).

Inal, et al., "High Transconductance Accumulation Mode Electrochemical Transistor", Advanced Materials, 26(44):7450-7455 (2014).

Jimison, et al. "Measurement of barrier tissue integrity with an organic electrochemical transistor." Adv Mater. 24(44):5919-23 (2012).

Kim, et al. "Organic electrochemical transistor based immunosensor for prostate specific antigen (PSA) detection using gold nanoparticles for signal amplification." Biosens Bioelectron. 25(11):2477-82 (2010).

Kuiper, et al. "Development and applications of very high flux microfiltration membranes" Journal of Membrane Science, 150:1-8 (1998).

La Ferla, et al. "Intracellular amyloid-beta in Alzheimer's disease." Nat Rev Neurosci., 8(7):499-509 (2007).

Liu, et al. "Competitive electrochemical immunoassay for detection of β-amyloid (1-42) and total β-amyloid peptides using p-aminophenol redox cycling." Biosens Bioelectron., 51:208-12 (2014).

Lopes, et al. "Direct electrochemical and AFM detection of amyloid-β peptide aggregation on basal plane HOPG", Nanoscale, 6(14): 7853-7 (2014).

Macchia, et al. "Ultra-sensitive protein detection with organic electrochemical transistors printed on plastic substrates", Flex. Print. Electron., 3: 034002 (2018).

Madhavan, et al. "Silver-enhanced block copolymer membranes with biocidal activity." ACS Appl Mater Interfaces, 6(21):18497-501 (2014).

Mariani, et al. "PEDOT: Dye-Based, Flexible Organic Electrochemical Transistor for Highly Sensitive pH Monitoring", ACS Appl Mater Interfaces, 10(26):22474-22484 (2018).

Nilsson, "Techniques to study amyloid fibril formation in vitro." Methods. 34(1): pp. 151-160 (2014).

Ochiishi, et al. "Immunohistochemical detection of the delayed formation of nonfibrillar large amyloid-β aggregates", Genes Cells, 21(2):200-11 (2016).

Pappa, et al., "Direct metabolite detection with an n-type accumulation mode organic electrochemical transistor", Sci Adv., 4(6):eaat0911 (2018).

Parlak, et al. "Molecularly selective nanoporous membrane-based wearable organic electrochemical device for noninvasive cortisol sensing", Sci Adv., 4(7):eaar2904 (2018).

Pedersen, et al. "Analysis of Protein Aggregation in Neurodegenerative Disease" ACS Anal. Chem., 85(9): 4215-4227 (2013).

Pinotsi, et al. "A label-free, quantitative assay of amyloid fibril growth based on intrinsic fluorescence." Chembiochem., 14(7): 846-50 (2013).

Piro, et al: "Fabrication and Use of Organic Electrochemical Transistors for Sensing of Metabolites in Aqueous Media", Applied Sciences, 8(6):928 (2018).

Rivnay, et al. "Organic electrochemical transistors" Nature Reviews Materials, 3: 17086 (2018).

Ruscito, et. al. "Small-Molecule Binding Aptamers: Selection Strategies, Characterization, and Applications." Front Chem., 4(14) (2016).

Schmode, et al. "High-Performance Organic Electrochemical Transistors Based on Conjugated Polyelectrolyte Copolymers", Chemistry of Materials, 31(14):5286-5295 (2019).

Schöneich, et al. "Free radical reactions of methionine in peptides: mechanisms relevant to beta-amyloid oxidation and Alzheimer's disease." J Am Chem Soc., 125(45):13700-13 (2003).

Sessolo, et al. "Ion-selective organic electrochemical transistors", Adv. Mater., 26(28): 4803-7 (2014).

Sun, et al. "n-Type organic electrochemical transistors: materials and challenges", J. Mater. Chem. C, 6:11778-11784 (2018).

Suprun, et al. "Direct electrochemical oxidation of amyloid-β peptides via tyrosine, histidine, and methionine residues", Electrochem. Comm., 65: 53-56 (2016).

Toyos-Rodriguez, et al. "Electrochemical Biosensors Based on Nanomaterials for Early Detection of Alzheimer's Disease", Sensors, 20(4748) (2020).

Tsai, et. al. "An integrated microfluidic system for the isolation and detection of ovarian circulating tumor cells using cell selection and enrichment methods." Biomicrofluidics, 11(3):034122 (2017).

Vestergaard, et al. "A rapid label-free electrochemical detection and kinetic study of Alzheimer's amyloid beta aggregation." J Am Chem Soc., 2005 V127(34): 11892-3 (2005).

Walsh, et al. "Naturally secreted oligomers of amyloid beta protein potently inhibit hippocampal long-term potentiation in vivo", Nature, 416(6880): pp. 535-539 (2002).

Wang, et al. "Functionalized Organic Thin Film Transistors for Biosensing" Acc. Chem. Res., 52(2):277-287 (2019).

Wolff, et al. "Aβ42 pentamers/hexamers are the smallest detectable oligomers in solution", 7(1): article 2493 (2017).

Wu, et al. "Binding of Congo Red to Amyloid Protofibrils of the Alzheimer Aβ9-40 Peptide Probed by Molecular Dynamics Simulations" Biophys J., 103(3):550-557 (2012).

Wu, et al. "Dual Binding Modes of Congo Red to Amyloid Protofibril Surface Observed in Molecular Dynamics Simulations" J. Am. Chem. Soc., 129(5):1225-1232 (2007).

Wustoni, et al. "Enzyme-Free Detection of Glucose with a Hybrid Conductive Gel Electrode." Adv. Mater. Interfaces, 6: 1970001 (2019a).

Wustoni, et al. "Sensitive electrical detection of human prion proteins using field effect transistor biosensor with dual-ligand binding amplification." Biosens Bioelectron. 67:256-62 (2015).

Wustoni, et al. "An organic electrochemical transistor integrated with a molecularly selective isoporous membrane for amyloid-[beta] detection" Biosensors and Bioelectronics, 143:111561 (2019b).

Yang, et al. "Nanoporous Membranes with Ultrahigh Selectivity and Flux for the Filtration of Viruses", Advanced Materials Communication, 18(6):709-712 (2006).

Young, et al., "Small molecule probes of protein aggregation" Current Opinion in Chemical Biology, 39:90-99 (2017).

Yu, et al. "Self-Assembled Isoporous Block Copolymer Membranes with Tuned Pore Sizes", Angewandte Chemie International Edition, 53(38):10072-10076 (2014).

Zhang, et al. "Design principles and fundamental understanding of biosensors for amyloid-[beta] detection" Journal of Materials Chemistry, 8(29): 6179-6196 (2020).

Zheng-Tao Zhu, et al. "A simple poly(3,4-ethylene dioxythiophene)/ poly(styrene sulfonic acid) transistor for glucose sensing at neutral pH" Chemical Communications, 13: 1556-1557 (2004).

Zhu, et al. "Isoporous Membranes with Sub-10 Nm Pores Prepared from Supramolecular Interaction Facilitated Block Copolymer Assembly and Application for Protein Separation." Journal of Membrane Science, 566:25-34 (2018).

(56) References Cited

OTHER PUBLICATIONS

International Search Report for corresponding PCT application PCT/IB2020/057339 dated Nov. 12, 2020.

* cited by examiner

- Glass substrate
- Gold
- Parylene C
- Anti-adhesive
- Photoresist
- Spin casted PEDOT:PSS

DEVICE FOR DETECTING ANALYTES IN A SAMPLE, AND METHODS OF USE THEREOF

CROSS-REFERENCE TO RELATED APPLICATION

The present application is a National Phase application under 35 U.S.C. § 371 of International Application No. PCT/IB2020/057339, filed on Aug. 3, 2020, which claims priority to U.S. Application No. 62/882,481, filed Aug. 3, 2019 and U.S. Application No. 62/985,015, filed Mar. 4, 2020, the disclosures of which are incorporated herein by reference in their entirety.

FIELD OF THE INVENTION

This invention relates to devices and methods useful in detecting an analyte of interest in a sample.

BACKGROUND OF THE INVENTION

Medical diagnostic testing methods are critical screening tools for the early detection of pathological conditions. Early detection permits the identification of such conditions at a stage when successful treatment is more likely. Early treatment also frequently involves less damaging or less invasive treatment methods and decreases the impact on the patient. In addition to routine screening, diagnostic testing is also used in a variety of other applications, including biopsy analysis and monitoring the results of ongoing medical treatment.

Limitations on the amount of diagnostic information that can be obtained from a sample include the size of the sample that can be obtained and readily manipulated, the processing time required to perform multiple tests, the tolerance of the sample for multiple treatment steps without loss of signal, and the cost for performing multiple methods of analysis. Oftentimes, cost is a limiting factor with respect to a diagnostic device. For example, neuroimaging techniques are expensive and require sophisticated instrumentation and a clinical setting, biochemical assays lack sensitivity and require tedious preparation steps, expensive labels and operation time. Electrochemical techniques have been proposed as a label-free alternative for the detection. However, this detection method suffers from poor selectivity because of the nonspecific adsorption of peptides onto the electrode surface and electrochemical interference from other electroactive groups in some analytes. Organic electrochemical transistors (OECTs) have been used for detection of particular species. For the detection of a particular species, the OECT channel or the gate electrode should be functionalized with a biorecognition element such as nucleotides or proteins. Via such functionalization routes, OECTs could detect pH, metal cations, metabolites, neurotransmitters, pathogens and antibodies, as well as disease-specific antigens and proteins. However, the biochemical modification of micron size OECT surfaces lacks the desired precision, and are highly complex and cost ineffective. The immobilization of recognition units is also known to lead to degradation of the electronic material underneath, compromising the intrinsic gain of the transistor. In addition, with such direct biological coating on the surfaces, the devices are typically for single-use, despite the cost.

There is still a need in the art for improved procedures for analyzing samples, and for compositions and articles of manufacture useful in such methods.

It is an object of the present invention to provide devices for detecting the presence and/or quantifying an analyte in a sample.

It is also an object of the present invention to provide a method for detecting and/or quantifying an analyte in a sample.

It is a further object of the present invention to provide kits for detecting and/or quantifying an analyte in a sample.

SUMMARY OF THE INVENTION

Devices for detecting an analyte in a sample suspected of containing the analyte, are provided. The devices include a bio-functional, nanostructured, isoporous membrane (BNIM)-integrated organic electrochemical transistor (OECT), herein BNIM-OECT, for the rapid and sensitive detection of the presence of an analyte of interest, in a sample. The OECT include a source electrode, a drain electrode, a channel, and a gate electrode. The membrane (i.e., BNIM) is physically separated from the OECT channel therefore the electronic device can be used multiple times. One major advantage presented by the design of the device is that the OECT can be integrated with a membrane functionalized with recognition moieties (i.e. binding partners) capturing other biomarkers/analytes of interest, such that the OECT is no longer chemically functionalized to include any recognition moiety (i.e. a binding partner). The sensing mechanism which is based on 1) capturing the biomarker/analyte onto the isoporous membrane 2) captured biomarker/analyte clogs the pores of the membrane and 3) the clogged pores change the transistor current. This concept can be used for sensing any analyte/biomarker in a sample, as long as the membrane has the right biorecognition units that recognize the analyte/biomarker. Accordingly, the isoporous membrane is preferably functionalized to include a binding partner for the analyte being detected. In particularly preferred embodiments, the binding partner is selected based on its size, such that the binding partner is smaller than the pores in the isoporous membrane. The isoporous membrane is preferably polymeric and in a particularly preferred embodiment, is made from the block copolymer poly(styrene-b-4-vinylpyridine), PS-b-P4VP.

The disclosed BNIM-OECT can be used to detect the presence of an analyte in a sample, preferably, a biological sample, such as blood, serum, cerebrospinal fluid, saliva, etc. By its ability to detect analytes in a biological sample, the disclosed BNIM-OECT can be used for disease detection, preferably, early disease detection, by functionalizing the BNIM-OECT with a binding partner to an analyte associated with the disease, collecting a biological sample from a subject suspected of having the disease, and applying the collected biological sample to the BNIM-OECT, where the decrease in channel current as a result of analyte binding to its binding partner on the isoporous membrane is used to detect the presence of the analyte in the sample. In a preferred embodiment, the device is used for early detection of Alzheimer's disease, using Congo red as a binding partner for binding amyloid beta aggregates in a biological sample obtained from a subject. In other embodiments, the sample is not a biological sample. It can be a sample from any source, so long as the sample contains an analyte to be detected.

Kits including the disclosed devices and reagents useful for performing the disclosed detection methods are also provided.

BRIEF DESCRIPTION OF THE DRAWINGS

(FIG. 1A) SEM image of the PS-b-P4VP membrane. The scale bar is 500 nm. (FIG. 1B) Schematic representation of molecular functionalization of the PS-b-P4VP membrane with APTES to generate amino terminated groups on the surface and the subsequent immobilization of the CR via the GA linker. High-resolution S2p (FIG. 1C), N1s (FIG. 1D), and O1s (FIG. 1E) XPS spectra of the membrane after its modification with APTES ($NH_2$-functionalized membrane) and CR (CR-functionalized membrane).

(FIG. 2A) Impaired cation drift into the PEDOT:PSS channel after the binding events on the membrane. The CR-functionalized membrane is placed between the channel and the electrolyte solution. The transfer characteristics (FIG. 2B) and transient characteristics (FIG. 2C) of an OECT before and after integration with the functionalized membrane as well as upon incubation of the membrane with Aβ aggregate solution (PBS, 22.1 nM). The channel has a width of 10 μm and length of 100 μm. For the transients, $V_G$=0.1 V with a length of 15 ms. FIG. 2D shows the 3D representation of the CR-functionalized membrane after incubation with Aβ aggregate solution (22.1 nM in PBS). The scale bar is 400 nm. High-resolution C1s (FIG. 2E), N1s (FIG. 2F), and O1s (FIG. 2G) XPS spectra of the CR-functionalized surface before and after the binding events.

(FIG. 3C) The current response of these devices to Aβ aggregates. The response of the biosensor (i.e., OECT integrated with CR-functionalized membrane) to Aβ peptide is shown by the yellow curve. Error bars represent the SD from measurements from at least three channels operated at $V_D$ of −0.6 V and $V_G$ of 0 V.

(FIG. 4A) The OECT response to Aβ aggregates (Aβ: 22.1 nM) and potential interferents (glucose: 10 mM; albumin 3.5 mg/mL) in PBS as well as to Aβ aggregates in a commercial human serum sample. The blue and red bars represent PBS and serum samples, respectively, as the medium. (FIG. 4B) Transfer curve of an OECT biosensor for in vitro analysis of Aβ aggregates, which were spiked in the human serum sample, and the corresponding calibration plot. For (a) and the inset of (b), error bars represent the SD of measurements from at least three channels operated at $V_D$ of −0.6 V and $V_G$ of 0 V.

FIG. 9B is a side view of a pair of source electrode and drain electrode connected with a channel depicted in FIG. 9A. FIG. 9C is a side view of a gate electrode with a BNIM placed on top depicted in FIG. 9A. FIG. 9D is a side view of a gate electrode functionalized with Aβ-42 antibody depicted in FIG. 9A. FIG. 9E is a side view of gate electrode functionalized with Aβ-40 antibody depicted in FIG. 9A.

DETAILED DESCRIPTION OF THE INVENTION

I. Definitions

Figure 1A:
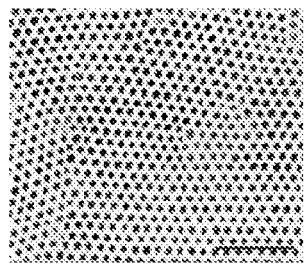
FIGS. 1A-1E show functionalization and characterization of the nanostructured, isoporous membrane.

An "analyte" or "analyte of interest" as used herein refers any molecule which can be bound by an analyte-specific binding agent.

"Graded membranes" as used herein refers to membranes that have a surface isoporous layer and a bulk/support layer where the bulk layer may have asymmetric porosity.

"Isoporous" as used herein refers to the surface layer of membranes which have a narrow pore size distribution.

Use of the term "about" is intended to describe values either above or below the stated value in a range of approx. +/−10%; in other embodiments the values may range in value either above or below the stated value in a range of approx. +/−5%; in other embodiments the values may range in value either above or below the stated value in a range of approx. +/−2%; in other embodiments the values may range in value either above or below the stated value in a range of approx. +/−1%. The preceding ranges are intended to be made clear by context, and no further limitation is implied.

II. Compositions

Devices for detecting an analyte in a sample, which incorporate bio-functional, nanostructured, isoporous membranes (BNIM) and an organic electrochemical transistor (OECT), herein BNIM-OECT, for the rapid and sensitive detection of the presence of a known analyte in a sample are disclosed.

By selecting materials for the isoporous membrane and organic electrochemical transistor as disclosed herein, the device employing the disclosed components have demonstrated superior sensitivity as high as 260 µA/dec. The examples below demonstrated that an exemplary device outperforms previously reported systems and displays the best reported performances in terms of sensitivity and detection range in relevant peptide amyloid-β (Aβ) concentration, with prolonged shelf life and improved operational stability.

"Shelf life" as used herein refers to the OECT's capability to preserve its detection sensitivity with less than about 5% change in the electrochemical signal. "Prolonged shelf life" is used to refer to the OECT's capability to preserve its detection sensitivity with less than about 5% change in the electrochemical signal after three repeated use. "Operational stability" as used herein refers to the OECT's capability to preserve its drain current when stressed with a gate voltage. "Improved operational stability" is used to refer to the OECT's capability to preserve its drain current (i.e. change of drain current is less than about 5%) when stressed with a 5 second long, continuous square-shaped voltage pulses at the gate electrode for at least 15 minutes.

A. Isoporous Membrane

Isoporous membranes that can be incorporated in the devices disclosed herein can be made from any material suitable of making isoporous membranes. The isoporous membrane is preferably polymeric and in a particularly preferred embodiment, is made from a block copolymer. A block copolymer is a polymer made up two or more polymerized monomer blocks. The disclosed isoporous membrane is preferably functionalized to include a binding partner for the analyte being detected. For example, where the analyte of interest is an Aβ aggregate, the membrane is functionalized to include a binding partner such as Congo-red. However, any binding partner can be attached to the surface of the membrane, the binding partner selected to be smaller in size than the pores of the isoporous layer of the membrane. The binding partner may be an aptamer for example, that recognizes a desired analyte. An "aptamer" as used within the context of an analyte-specific binding agent may be a short single-stranded nucleic acid molecule, e.g. an RNA, DNA, molecule or any other suitable nucleic acid format known to the person skilled in the art, being capable of binding an analyte, or a peptide aptamer. Peptide aptamers are aptamers which are able to specifically bind to (a) protein(s), polypeptide(s) or peptide(s) comprising a specific amino acid sequence. Typically, a peptide aptamer has a peptide loop, comprising for example 10 to 20 amino acids.

Methods for evolving aptamers that bind to analytes of interest are known in the art. Aptamers evolved against small molecules are reviewed in Rusccito, et al., *Front Chem.*, 4:14 (2016) including Z)-4-(3,5-difluoro-4-hydroxybenzylidene)-1,2-dimethyl-1H-imidazol-5(4H)-one (DFHBI), 17β-estradiol, 17β-estradiol, Aflatoxin B1, B2, and M1, Anatoxin-A, Atrazine, Benzylguanine, Brevetoxin-2, Bromacil, Cd (II), Danfloxacin, Fumonisin B1, Kanamycin A, Kanamycin A, Ketamine, Lysergamine, Malathion, Methamphetamine, N-methyl, esoporphyrin (NMM), Ochratoxin A., Okadaic Acid, Okadaic acid, Organophosphorus pesticides, Oxytetracycline, Pd II, Polychlorinated biphenyls, Polychlorinated biphenyls, Progesterone, T-2 toxin, Tebuconazole, inabenfide, and mefenacet. OTA-Sense is an aptamer-based sensing technology developed by Neoventures Biotechnology Inc. for the detection of Ochratoxin A (OTA), a toxin produced by fungi (*Aspergillus* and *Penicillium* species) that grow on agricultural products including, but not limited to grapes, dried fruits, cereals, coffee etc. OTA is one of the most common mycotoxins with known carcinogenic properties. Aptamers for detecting circulating tumor cells are known in the art and are disclosed for example in Tasi, et al., *Biomicrofluidics*, 11(3):034122 (2017).

In some embodiments, the binding partner may be an antibody, an organic molecule, or a carbohydrate. Antibodies, organic molecules, and carbohydrates that recognize a desired analyte are known to the person skilled in the art, for example, in https://www.invivogen.com/antibodies-list, Baltzer, *Analytical and Bioanalytical Chemistry*, 400(6): 1653-1664 (2011), and Galanina, et al., *Analytical Biochemistry*, 265(2):282-289 (1998).

The isoporous membrane is in some embodiments, a graded membrane. In particularly preferred embodiments, the binding partner is selected based on its size, such that the binding partner is smaller than the pores in the isoporous membrane, for example, for graded membranes, pores on at least one surface of the graded membrane. Such membranes are formed by self-assembly and non-solvent-induced phase separation of block copolymers i.e., a combination of macrophase separation due to the immersion in the non-solvent bath and of microphase separation due to the self-assembly of the block copolymer. The latter leads to the formation of the highly ordered surface layer.

Graded membranes with an isoporous surface are disclosed for example, in 2014/0217012, which discloses producing membranes with an isoporous surface by forming a film comprising a multiblock copolymer having a hydrogen-bonding block (e.g., poly((4-vinyl)pyridine), poly((2-vinyl) pyridine), poly(ethylene oxide), poly(methacrylate), poly (methyl methacrylate), poly(dimethylethyl amino ethyl methacrylate), poly(acrylic acid), and poly(hydroxystyrene)) that can self-assemble on a substrate using a deposition solution comprising the multiblock copolymer and a solvent system (e.g., 1,4-dioxane); removing at least a portion of the solvent system from the film; and contacting the film from step b) with a phase separation solvent system, such that the isoporous graded film is formed. The films resulting from the method have an identifiable surface layer and an identifiable bulk layer. There is an identifiable transition layer between the surface layer and the bulk layer. The transition layer has a structure having characteristics of both the surface layer and the bulk layer. The surface layer, transition layer, and bulk layer form a continuous film.

In the graded membranes disclosed above, the surface layer can have a thickness of from 20 nm to 500 nm, including all values to the nm and ranges in between. The surface layer has a plurality of pores extending through the depth of the surface layer. The pores can have morphologies such as cylindrical, conical, and/or gyroid morphologies. The pores can have a size (e.g., diameter) of from 3 nm to 100 nm, including all values to the nm and ranges there between, for example, between 5 and 100 nm, between 5 nm and 95 nm, between 5 nm and 15 nm, between 10 nm and 90 nm, between 15 nm and 85 nm, between 20 nm and 80 nm, between 20 nm and 70 nm, between 25 nm and 75 nm, between 30 nm and 70 nm, between 35 nm and 65 nm, or between 40 nm and 60 nm. In some embodiments, the analytes can have different sizes at different stages of their development. For example, Aβ aggregates have a size between 5 nm and 15 nm in oligomeric form and a size between 20 nm and 70 nm in protofibril form. Selecting the size of the pores can therefore detect Aβ aggregates at different stages of their development.

The surface layer can have a range of pore densities. For example, the surface layer pore density can be from $1\times10^{14}$ pores/m$^2$ to $1\times10^{15}$ pores/m$^2$. The surface layer is isoporous, i.e., the pores have narrow pore size distribution. For example, a narrow pore size distribution (defined as the ratio of the maximum pore diameter to the minimum pore diameter ($d_{max}/d_{min}$)) can be from 1 to 3, including all values to 0.1 and ranges therebetween. In various examples, ($d_{max}/d_{min}$) is 1, 1.5, 2, 2.5, or 3. In an embodiment, the isoporous surface layer has a pore density of at least $1\times10^{14}$ pores/m$^2$ and a pore size distribution ($d_{max}/d_{min}$) of less than 3.

Membranes with "graded" morphology are also disclosed in U.S. Pat. No. 9,914,099 which discloses a polymer membrane having an isoporous surface layer and a supporting layer. An isoporous membrane with a self-assembled isoporous morphology on the top layer, while a macrophase separation by spinodal decomposition led to the formation of larger pores far from the membrane surface. This process is known as self-assembly and non-solvent-induced phase separation of block copolymers.

The bulk/supporting layer can have a range of thicknesses. For example, the thickness of the bulk layer can be from 5 microns to 500 microns, including all values to the micron and ranges therebetween. The pores in the bulk layer can be from 10 nm to 100 microns in size (e.g., diameter). In some embodiments, the pores in the surface are smaller than the pores in the bulk layer. The bulk layer can have an asymmetric structure. For example, the layer can have a sponge-like or finger-like structure. Moving from the top of this layer (e.g., the surface in contact with the surface layer) to the bottom of the layer (e.g., the free surface), the pores increase in size. For example, the bulk layer can have pores having a size of 10 nm at the top of the bulk layer (layer in contact with the surface layer) and the pores increase in size to 100 μm at the bottom of the bulk layer. The increase in pore size moving though the depth of the film (e.g., from the surface of the bulk film in contact with the surface layer to the surface of the film in contact with the substrate) provides an asymmetric structure. This bulk layer is formed as a result of contacting (e g, immersing) the film into a non-solvent bath (e.g., the NIPS process).

Self-assembled isoporous block copolymer membranes with tuned pore sizes such as those disclosed in Yu, et al., *Angew Chem Int Ed Engl.*, 53(38):10072-6 (2014). The pore sizes can be controlled precisely between 3 and 20 nm leading to a tunable sharp size discrimination.

i. Membrane Materials

Suitable materials include, but are not limited to aluminum (electrolytic oxidation of aluminum), polymers, including homopolymers, co-polymers, such as block copolymers. Multiblock copolymers can have a range of polydispersities ($M_w/M_n$). For example, the multiblock copolymer can have a polydispersity index (PDI) of from 1.0 to 2.0, including all values to the 0.1 and ranges therebetween. It is desirable that the multiblock copolymer have a PDI of 1 to 1.4.

Preferred block polymers include poly(styrene-b-4-vinylpyridine), PS-b-P4VP, PS-b-P2VP (polystyrene-b-poly-2-vinylpyridine) and PS-b-PEO (polystyrene-b-polyethylene oxide).

Other examples of suitable diblock copolymers include poly(styrene)-b-poly(methyl methacrylate), poly(styrene)-b-poly(acrylic acid), poly(styrene)-b-poly(dimethylethyl amino ethyl methacrylate), poly(styrene)-b-poly(hydroxystyrene), poly(α-methyl styrene)-b-poly((4-vinyl)pyridine), poly(α-methyl styrene)-b-poly((2-vinyl) pyridine), poly(α-methyl styrene)-b-poly(ethylene oxide), poly(α-methyl styrene)-b-poly(methyl methacrylate), poly(α-methyl styrene)-b-poly(acrylic acid), poly(α-methyl styrene)-b-poly(dimethylethyl amino ethyl methacrylate), poly (α-methyl styrene)-b-poly(hydroxystyrene), poly(isoprene)-b-poly((4-vinyl)pyridine), poly(isoprene)-b-poly((2-vinyl) pyridine), poly(isoprene)-b-poly(ethylene oxide), poly(isoprene)-b-poly(methyl methacrylate), poly(isoprene)-b-poly(acrylic acid), poly(isoprene)-b-poly(dimethylethyl amino ethyl methacrylate), poly(isoprene)-b-poly(hydroxystyrene), poly(butadiene)-b-poly((4-vinyl)pyridine), poly(butadiene)-b-poly((2-vinyl) pyridine), poly(butadiene)-b-poly(ethylene oxide), poly(butadiene)-b-poly(methyl methacrylate), poly(butadiene)-b-poly(acrylic acid), poly(butadiene)-b-poly(dimethylethyl amino ethyl methacrylate), and poly(butadiene)-b-poly(hydroxystyrene).

Examples of suitable triblock copolymers include poly(isoprene-b-styrene-b-4-vinylpyridine), poly(isoprene)-b-poly(styrene)-b-poly((4-vinyl)pyridine), poly(isoprene)-b-poly(styrene)-b-poly((2-vinyl) pyridine), poly(isoprene)-b-poly(styrene)-b-poly(ethylene oxide), poly(isoprene)-b-poly(styrene)-b-poly(methyl methacrylate), poly(isoprene)-b-poly(styrene)-b-poly(acrylic acid), poly(isoprene)-b-poly(styrene)-b-poly(dimethylethyl amino ethyl methacrylate), poly(isoprene)-b-poly(styrene)-b-poly(hydroxystyrene), poly(isoprene)-b-poly(α-methyl styrene)-b-poly((4-vinyl) pyridine), poly(isoprene)-b-poly(α-methyl styrene)-b-poly((2-vinyl) pyridine), poly(isoprene)-b-poly(α-methyl styrene)-b-poly(ethylene oxide), poly(isoprene)-b-poly(α-methyl styrene)-b-poly(methyl methacrylate), poly(isoprene)-b-poly(α-methyl styrene)-b-poly(acrylic acid), poly(isoprene)-b-poly(α-methyl styrene)-b-poly(dimethylethyl amino ethyl methacrylate), poly(butadiene)-b-poly(styrene)-b-poly((4-vinyl)pyridine), poly(butadiene)-b-poly(styrene)-b-poly((2-vinyl) pyridine), poly(butadiene)-b-poly(styrene)-b-poly(ethylene oxide), poly(butadiene)-b-poly(styrene)-b-poly(methyl methacrylate), poly(butadiene)-b-poly(styrene)-b-poly(acrylic acid), poly(butadiene)-b-poly(styrene)-b-poly(dimethylethyl amino ethyl methacrylate), poly(butadiene)-b-poly(styrene)-b-poly(hydroxystyrene), poly(butadiene)-b-poly(α-methyl styrene)-b-poly((4-vinyl) pyridine), poly(butadiene)-b-poly(α-methyl styrene)-b-poly((2-vinyl) pyridine), poly(butadiene)-b-poly(α-methyl styrene)-b-poly(ethylene oxide), poly(butadiene)-b-poly(α-methyl styrene)-b-poly(methyl methacrylate), poly(butadiene)-b-poly(α-methyl styrene)-b-poly(acrylic acid), poly(butadiene)-b-poly(α-methyl styrene)-b-poly(dimethylethyl amino ethyl methacrylate), and poly(butadiene)-b-poly(styrene)-b-poly(hydroxystyrene).

ii. Surface Functionalization

The isoporous membrane is preferably functionalized to include a binding partner for the analyte being detected. In particularly preferred embodiments, the binding partner is selected based on its size, such that the binding partner is smaller than the pores in the isoporous membrane, i.e., on an isoporous surface of the membrane. In one particularly preferred embodiment, the membrane is functionalized to introduce amino terminated groups on the surface of the membrane, which can then be cross-linked to binding partners containing amino groups (for example Congo red, peptide aptamers, peptides, etc.), by crosslinking agents such as glutaraldehyde. Amino groups are preferably introduced onto the surface of the membrane by reacting with 3-aminopropyltriethoxysilane, for example, as demonstrated in the Examples. Localization of nucleic acids on a nanoporous membrane is described for example, in Erli, et al., *Clinical Chemistry*, 50(10):1819-1821 (2004). Cysteine surface modified isoporous membranes are disclosed in Kumar, et al., *Journal of Membrane Science* (2017) 529 185-194.

B. Organic Electrochemical Transistor (OECT)

The disclosed devices include a molecularly functionalized, preferably nanostructured, and isoporous membrane and its integration with a high gain, ion-to-electron transducing device, the OECT. The OECT that can be used herein are three terminal devices which include a source electrode, a drain electrode, a channel, and a gate electrode. The source electrode and the drain electrode are placed apart and connected electronically by a corresponding channel. In some embodiments, the source electrode, the drain electrode, and the channel can be patterned on a supporting substrate, such as a glass substrate, a silicon substrate, or a plastic substrate. The gate electrode is placed separately from the source electrode, the drain electrode, and the channel to prevent electron flow between the gate electrode and the channel. The channel is in direct contact with the measurement (electrolyte) solution, into which the gate electrode is also immersed. The isoporous membrane can be integrated with a microscale OECT by interposing it vertically, in between the channel and the electrolyte. As the membrane selectively captures analytes in solution, the analytes become immobilized on its surface because of their larger size compared to pores in the surface layer. A typical BNIM-OECT device is exemplified in FIG. 2A. The device may be incorporated into a microfluidics configuration.

In some embodiments, the OECT contains a plurality of independently addressable source and drain electrodes, corresponding channels, and one or more gate electrodes for detecting multiple analytes simultaneously. In such configurations, each channel has a corresponding BNIM placed above, which contains binding partners for an analyte being detected. In some embodiments, the corresponding BNIMs can have the same or different pore sizes. For example, one or more corresponding BNIMs can have a first pore size, such as between 5 nm and 15 nm, and at least one corresponding BNIM that has a second pore size, such as between 20 nm and 70 nm. The corresponding BNIMs that have different pore sizes may be functionalized with the same or different binding partners.

The channel is typically made of an ion-permeable organic electronic material, through which holes or electrons flow from the source electrode to the drain electrode. The OECT relies on ions that are injected from the electrolyte into the ion-permeable organic electronic material, thereby changing its doping state and thus its conductivity. The operation of OECT is controlled by voltages applied to the gate electrode (gate voltage, $V_G$) and to the drain electrode (drain voltage, $V_D$), which are referenced with respect to the source electrode. The drain voltage induces a current (drain current, $I_D$), which is proportional to the quantity of mobile holes or electrons in the channel, and thus probes the doping state of the organic electronic material. The gate voltage controls the injection of ions into the channel and thus the doping state of the organic electronic material, resulting in a change in $I_D$.

The doping changes in OECT occur over the entire volume of the channel because of the injection barrier-free penetration of electrolyte ions into the bulk of the organic channel, causing a large modulation of the carrier density therein. The device translates small ionic fluxes in the electrolyte into a large electrical readout from the channel. Therefore, the transducing event is coupled with amplification, and endows the OECT with high gain at low voltages (<1V).

i. Source and Drain Electrodes

The source and drain electrodes are made from materials capable of conducting an electric current. The electrode materials can be organic or inorganic in nature, as long as it is able to conduct electrons through the material. The electrodes can be a polymeric electrode, a metallic electrode, a semiconductor, a carbon-based material, a metal oxide, or a modified electrode. In some embodiments, the source and drain electrodes are made from an electrochemically inert material such as gold, platinum, or a conductive form of carbon, in order to prevent electrochemical corrosion upon operation whilst in contact with the electrolyte solution. In some embodiments, the electrodes are gold electrodes having a portion coated with an additional insulating layer such as Parylene C.

In some embodiments, the electrodes are made from a metallic conductor. Suitable metallic conductors include but are not limited to gold, chromium, platinum, iron, nickel, copper, silver, stainless steel, mercury, tungsten and other metals suitable for electrode construction. The metallic conductor can be a metal alloy which is made of a combination of metals disclosed above, such as gold/chromium. In addition, conductive substrates which are metallic conductors can be constructed of nanomaterials made of gold, cobalt, diamond, and other suitable metals.

In other embodiments, the electrodes are made from carbon-based materials. Exemplary carbon-based materials are conducting polymers (in the form of films or fibers) carbon cloth, carbon paper, carbon screen printed electrodes, carbon paper, carbon black, carbon powder, carbon fiber, singe-walled carbon nanotubes, double-walled carbon nanotubes, multi-walled carbon nanotubes, carbon nanotube arrays, diamond-coated conductors, glassy carbon and mesoporous carbon. In addition, other exemplary carbon-based materials are graphene, graphite, uncompressed graphite worms, delaminated purified flake graphite, high performance graphite and carbon powders, highly ordered pyrolytic graphite, pyrolytic graphite, and polycrystalline graphite.

The electrodes can be semiconductors. Suitable semiconductors are prepared from silicon and germanium, which can be doped (i.e., the intentional introduction of impurities into an intrinsic semiconductor for the purpose of modulating its electrical and structural properties) with other elements. The semiconductors can be doped with phosphorus, boron, gallium, arsenic, indium or antimony, or a combination thereof.

Other electrode materials can be metal oxides, metal sulfides, main group compounds, and modified materials. Exemplary materials of this type are nanoporous titanium oxide, tin oxide coated glass, glass, cerium oxide particles, molybdenum sulfide, boron nitride nanotubes, aerogels modified with a conductive material such as gold, solgels modified with conductive material such as carbon, ruthenium carbon aerogels, and mesoporous silicas modified with a conductive material such as gold.

In some embodiments, the electrodes contain one or more conducting materials. In embodiments where the electrodes containing two or more conducting materials, the first conducting material can be a conducting polymer and a second conducting material can be a material disclosed above. The conducting polymers include but are not limited to poly (fluorine)s, polyphenylenes, polypyrenes, polyazulenes, polynaphthalenes, poly(pyrrole)s, polycarbozoles, polyindoles, polyzaepines, polyanilines, poly(thiophene)s, poly(3, 4-ethylenedioxythiophene), poly(p-phenylene sulfide), poly (acetylene)s, poly(p-phenylene vinylene), and polyimides. The second conducting material can be sputter coated on top of the conducting polymer, and the aggregate of the two makes up the conductive substrate. A preferred conductive substrate is a Kapton (polyimide) film sputter coated with Cr/Au.

The source and drain electrodes can be any shape appropriate such as rectangular, square, circular, and cylindrical. In a preferred embodiment, the electrodes are rectangular gold electrodes having a portion coated with Parylene C.

ii. Channel

Generally, the channel is configured to establish the electrochemical connection between a pair of source and drain electrodes such that holes or electrons flow from the source electrode to the drain electrode.

The channel is typically made of an ion-permeable organic electronic material, such as a conducting polymer disclosed in, for example, Rivnay, et al., *Nature Reviews*, 3:17086 (2018) and Sun, et al., *J. Mater. Chem. C*, 6:11778-11784 (2018). An exemplary conducting polymer for the channel is poly(3,4-ethylenedioxythiophene) doped with poly(styrene sulfonate) (PEDOT:PSS). The conducting PEDOT is p-type doped (oxidized), which leads to mobile holes that can hop from one chain to another, resulting in a hole current once a drain voltage is applied. These holes are compensated by the sulfonate anions of PSS. Channels made of PEDOT:PSS can work in depletion mode OECT. For example, in the absence of a gate voltage, a hole current flows in the channel. Once a positive gate voltage is applied, cations from the electrolyte are injected into the channel and the anions are compensated, resulting in a decrease in the number of holes in the channel. This results in a decrease in the drain current. Alternatively, the channel can be made of materials that work in accumulation mode OECT, such as a semiconductor based on a polythiophene with a sulfonate group attached to the backbone with a hexyl chain (PTHS) (Inal, et al., *Adv. Mater.*, 26:7450-7455 (2014)). In accumulation mode OECT, application of a negative gate voltage causes injection of anions into the channel and a corresponding accumulation of holes, leading to an increase in the drain current.

The active polymer for the channels of OECTs is not limited to PEDOT:PSS. Other suitable conducting polymers for the channel include, but are not limited to, conductor based on PEDOT with a pendant sulfonate group (PEDOT-S), PEDOT doped with tosylate (PEDOT:TOS), PEDO-TOH:ClO$_4$, PEDOT-co-PEDOTOH:ClO$_4$ (Schmode, et al., *Chem. Mater.*, 31(14):5286-5295 (2019)), poly(2-(3,3'-bis (2-(2-(2-methoxyethoxy) ethoxy)ethoxy)-[2,2'-bithiophen]-5-yl)thieno[3,2-b] thiophene) p(g2T-TT), poly((ethoxy) ethyl 2-(2-(2-methoxyethoxy) ethoxy)acetate)-naphthalene-1,4,5,8-tetracarboxylic-diimide-co-3,3'-bis(2-(2-(2-methoxyethoxy)ethoxy) ethoxy)-(bithiophene)) p(gNDI-g2T), P3HT (poly(3-hexylthiophene-2,5-diyl)), BBL (polybenzimidazo-benzoisoquioline), PTHS$^-$TMA$^+$-co-P3HT (poly[(6-thiophen-3-yl)hexane-1-sulfonate-co-3-(hexylthiophene)]), poly(N,N'-bis(7-glycol)-naphthalene-1,4,5,8-bis(dicarboximide)-co-2,2'-bithiophene-co-N,N'-bis (2-octyldodecyl)-naphthalene-1,4,5,8-bis(dicarboximide), naphthalene-1,4,5,8-tetracarboxylic-diimide-bithiophene (NDI-T2) polymer with 90% glycol chain percentage (P-90), and p(g0T2-g6T2).

The channel can be between 1 μm and 1000 μm, between 1 μm and 100 μm, or between 5 μm and 50 μm, for example, about 10 μm. The width of the channel can be between 10 μm and 1000 μm, between 20 μm and 500 μm, or between 20 μm and 200 μm, for example, about 100 μm.

Typically, the channel remains unmodified, i.e., it is not chemically modified to anchor binding partners. The analyte recognition takes place at the BNIM, which is not in physical contact with the channel. This configuration allows prolonged shelf life and improved operational stability of the device. The OECT can preserve its detection sensitivity with less than about 5% change in the electrochemical signal after at least three repeated use. The OECT can also preserve its drain current (i.e. change of drain current is less than about 5%) when stressed with a 5-second long, continuous square-shaped voltage pulses at the gate electrode for at least 15 minutes.

iii. Gate Electrode

The gate electrode is configured to control the injection of ions into the channel, typically placed in the measurement solution with the source electrode, the drain electrode and the channel, but not in contact with these components.

The gate electrode can be any shape appropriate such as rectangular, square, circular, and cylindrical.

Generally, the gate electrode can be made from any material described above for the source and the drain electrodes (e.g., Pt or Au) or it can be a common reference electrode, such as a silver/silver chloride (Ag/AgCl) reference electrode. Additional exemplary reference electrodes include, but are not limited to, a standard hydrogen electrode, a normal hydrogen electrode, a reversible hydrogen electrode, a saturated calomel electrode, a copper-copper (II) sulfate electrode, a palladium-hydrogen electrode, a dynamic hydrogen electrode, and a mercury-mercurous sulfate electrode.

iv. Electrolyte Solution

The electrolyte solution is in electrically contact with the channel and the gate electrode, and at least a portion of the source electrode and the drain electrode. The electrolyte solution is a solution that contains ions or molecules that have lost or gained electrons, and is electrically conductive. Electrolyte solutions include, but are not limited to, buffers such as phosphate buffered solution, phosphate buffered saline, salt water, MES buffer, Bis-Tris buffer, ADA, ACES, PIPES, MOPSO, Bis-Tris propane, BES, MOPS, TES, HEPES, DIPSO, MOBS, TAPSO, Trizma, HEPPSO, POPSO, TEA, EPPS, Tricine, Gly-gly, Bicine, HEPBS, TAPS, AMPD, TABS, AMPSO, CHES, CAPSO, AMP, CAPS, CABS, and a combination thereof; biological fluids such as whole blood, serum, urine, saliva, sweat; and a combination of any of the buffers with any of the biological fluids described above. The electrolyte solution can have a pH between about 5.5 and about 8.5, between about 6 and about 8, or between about 6.5 and about 7.5, preferably about 7.4.

The electrolyte solution can contain an analyte. The analyte preferably has a size larger than the pores in the surface layer of the isoporous membrane, thus can block the pores upon binding with a binding partner in the isoporous membrane. Selecting an analyte having a larger size relative to the pores is known in the art. For example, Aβ aggregates have a size about 50 nm thus can block pores having a diameter less than 50 nm. Sehlin, et al., PLOS ONE 7(2): e32014 (2012).

v. Supporting Substrate

A supporting substrate can be used to support the source electrode, drain electrode, and the channel.

The supporting substrates are typically formed from non-conducting materials. Exemplary supporting substrates include, but are not limited to, glass, silicon, plastic, and paper (including paper, coated paper, resin-coated paper, paper laminates, paperboard, and corrugated board). Materials for the supporting substrates include, but are not limited to, polyethylene terephthalate, polyethylene naphthalene dicarboxylate, polyethylene, polypropylene, polycarbonate, silica, silicon dioxide, quartz, and fiber.

The components identified above can be patterned on the supporting substrate. The components can be physically and/or chemically connected with the supporting substrate. For example, the components are physically connected with the supporting substrate by coating such as by sputter-coating, spin-coating, or drop-casting.

Figures 7A, 7B, 7C, 7D:
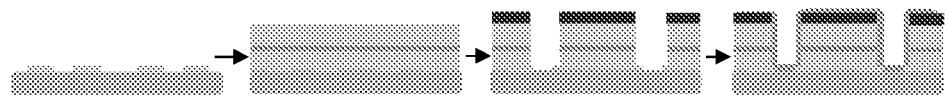
FIGS. 7A-7E are schematics illustrating the fabrication of the OECT via photolithography using the parylene-C peel-off process.
Figure 7E:
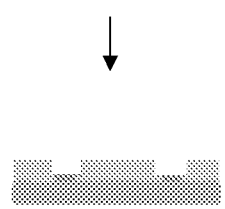

In some embodiments, the components identified above are patterned on a single layer of the supporting substrate. An exemplary configuration is shown in FIG. 7E. A gate electrode may also be patterned on the same supporting substrate, see, for example, FIG. 9A.

C. OECT Arrays and Microfluidic Configuration

Figures 8A, 8B:
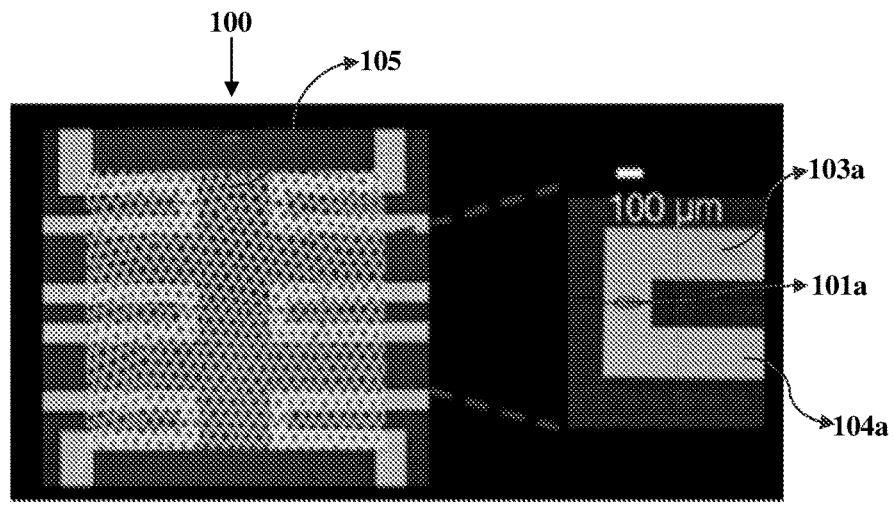
FIG. 8A is a schematic showing the configuration of the source and drain electrodes, and channels patterned on a glass substrate in the form of an array.
FIG. 8B is a magnified view of one of the source and drain electrode and the corresponding channel depicted in FIG. 8A.

In some embodiments, a plurality of independently addressable source and drain electrodes and corresponding channels are patterned on the supporting substrate to form an array. An exemplary configuration for the array (100) is shown in FIGS. 8A-8B. As shown in FIG. 8A, a pair of source electrode (see, for example, 103a) and drain electrode (see, for example, 104a) are placed apart and connected electronically by a corresponding channel (see, for example, 101a). Each corresponding channel can be coupled with an isoporous membrane (see, for example, 105) containing binding partners for a particular analyte. Optionally, the corresponding channels in the array can be each coupled with a different isoporous membrane containing different binding partners and/or different pore sizes in the surface layer, for detecting multiple analytes simultaneously. In some embodiments, the multiple analytes are indicative for the same disease, thereby increasing the diagnosis/prognosis accuracy of this disease.

The array may include one or more gate electrodes patterned on the same supporting substrate. Each of the one or more gate electrodes can control the injection of ions into one or more of the corresponding channels in the array. For example, all the channels in the array can be controlled by a common gate electrode. Alternatively, a first group of at least one corresponding channel is controlled by a first gate electrode and a second group of one or more corresponding channels is controlled by a second electrode. Optionally, the array contains the same numbers of gate electrodes as the corresponding channels, where each gate electrode controls ion injection into one of the corresponding channels.

In some embodiments, one or more gate electrodes in the array may be functionalized with a binding partner that is different from the binding partner in the BNIM, such as antibodies (e.g., antibodies for Aβ-42 and Aβ-40 peptides). Binding of analytes at the gate electrode will change the work function of the gate electrode and/or its double layer capacitance, thereby changes the current in the corresponding channel and/or the OECT threshold voltage. Typically, at least one of the one or more gate electrodes remain unfunctionalized Each of the functionalized gate electrodes in the array can contain a different binding partner from one another. For example, the array contains a first group of one or more corresponding channels coupled with a BNIM functionalized with a first binding partner and a first gate electrode controlling ion injection into these channels that are not functionalized; a second group of one or more corresponding channels coupled with a second gate electrode that is functionalized with a second binding partner different from the first binding partner; and a third group of one or more corresponding channels coupled with a third gate electrode that is functionalized with a third binding partner different from the first and second binding partners.

In some embodiments, the OECT array is integrated with a microfluidic configuration. For example, the OECT array is patterned on a supporting substrate containing microfluidic channels for directing the flow of samples and/or electrolyte solution, and/or holding the components of the OECT. When incorporated in the microfluidic configuration, the BNIM can be placed on top of the gate electrode. For example, the substrate contains microfluidic channels where the source electrode, drain electrode, channel, and gate electrode/BNIM of the OECT are placed inside the microfluidic channels such that a sample is directed to flow in the channel and flow through the gate electrode/BNIM and into the OECT channel. The microfluidic configuration can improve the alignment between the channel and the BNIM and allow analyte binding to occur more uniformly in the BNIM, leading to increased sensitivity and reproducibility. The array integrated with microfluidic channels can detect multiple analytes with BNIM functionalized with different binding partners and/or with different pore sizes on the top layer, and/or gate electrodes functionalized with different binding partner as described above.

Figure 9A:
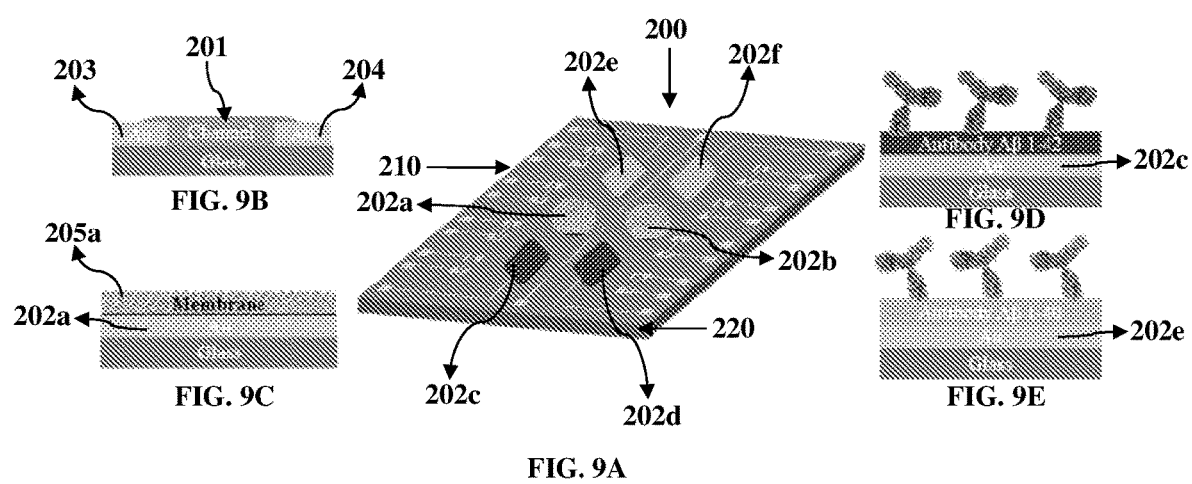
FIG. 9A is a schematic showing the OECT array configuration.

An exemplary multi-modal OECT array configuration (200) is shown in FIGS. 9A-9E. As shown in FIG. 9A, an array of OECTs (210) is patterned in a supporting substrate (220). Each OECT contains a pair of source electrode (see, for example, FIG. 9B, 203) and drain electrode (see, for example, FIG. 9B, 204) placed apart and connected electronically by a corresponding channel (see, for example, FIG. 9B, 201). The array 210 also contains six gate electrodes (202a-202f). Gate electrodes 202a and 202b remain unfunctionalized and each has a BNIM placed on top (see, for example, FIG. 9C, 205a). The two BNIM can include the same or different binding partners, and/or have the same or different pore sizes on the top layer. Gate electrodes 202c and 202d are functionalized with antibody Aβ-42 (see, for example FIG. 9D). Gate electrodes 202e and 202f are functionalized with antibody Aβ-40 (see, for example FIG. 9E). The gate electrodes 202c-202f can be functionalized with any desirable binding partners that are different from the binding partner in the BNIM, such as Aβ-40, Aβ-42, and Plasma Neurofilament Light. Each of the six gate electrodes can control ion injection into one or more of the corresponding channels.

III. Methods of Making and Using

A. Methods of Making i. Methods of Preparing the Isoporous Membranes

Method of preparing isoporous membranes with desired pore sizes are known in the art. Isoporous membranes can be prepared by various methods, including but not limited to microfabrication, anodization, and advanced material synthesis.

Membranes with a low variance in the distribution of their pore size can be produced through electrolytic oxidation of aluminum, see Furneaux et al. *Nature,* 337, 1989, pages 147-149. These membranes are offered, for example, under their trade name ANOPORE®. Isoporous filter membranes can also be created through lithographic methods, such as the interference lithography, see Kuiper et al: *Journal of Membrane Science* 150, 1998, page 1-8. In this case, the microfiltration membranes are also called microsieves.

More recent methods for the production of isoporous membranes is based on the self-organization ability of block copolymers (Russel et al: Advanced Materials 18, 2006, pages 709-712). Block copolymers are polymers that are made up of more than one type of monomers and whose molecules are linked linearly in blocks. The blocks are interconnected directly or through structural units that are not part of the blocks. In this method, an A-B diblock copolymer is dissolved in a solvent together with a certain amount of homopolymer B. Through the controlled evaporation of the solvent, films can form on a solid underlay, e.g. a silicon wafer, which have cylinders arranged regularly perpendicular to the surface, which consist of the block B and the homopolymer B. The homopolymer B is dissolved out of these films by a selective solvent so that a nanoporous film is created. The film can now be released by water and transferred to a porous carrier. This creates a composite membrane with an isoporous separation layer.

U.S. Pat. No. 9,914,099 (incorporated herein by reference) describes a method for preparing isoporous membranes from a polymeric material. The method in sum, includes dissolving one or more polymers, at least one of which is a block copolymer, in a fluid to produce a casting solution. In certain aspects, the block copolymer may consist of two or three different polymer blocks with at least two blocks being incompatible and result in microphase separation. In a further aspect, one block is hydrophobic and the other hydrophilic. The block copolymer should have a narrow molecular weight distribution. The polymer dispersity index (PDI) should be smaller than 1.5, 1.4, 1.3 or less. In certain embodiments one of the polymer blocks comprises functional groups that form coordination complexes or salts with metal ions. Examples of such polymer blocks includes, but is not limited to polyvinylpyridine, polyanilin, polypyrrole, polytriazole, polyhydrazide, polyethylene glycol and polyacrylic acid. The concentration of the block copolymer in the above mentioned casting solution should be higher than or about 5, 10, 15, or 20 wt % to between 15, 20 or 25 wt %, including all values and ranges there between. The casting solution includes at least one solvent for at least one of the block copolymers. The casting solution can include one or more solvents. The solvents are typically polar solvents and include those solvents miscible with water. Examples of such solvents include, but are not limited to dimethylformamide, dimethylacetamide, N-methylpyrolidone, dimethylsulfoxide and tetrahydrofuran. After the casting structure is prepared it is immersed into a non-solvent bath, preferably water. A non-solvent is a solution or liquid in which the block copolymer is not sufficiently soluble, thus phase separation of the polymer in the casting structure is induced by immersion in the non-solvent. By non-solvent induced phase separation an asymmetric polymer material is formed. This polymer material consists of a porous substructure (support layer) covered by a thin layer with a highly ordered pore structure (isoporous layer) containing cylinders or aligned interconnected spheres oriented perpendicular to the membrane surface. The cylindrical structures are formed by the hydrophilic block of the block copolymer. The diameter of the pore formed by this structure vary very little in diameter.

Isoporous membranes with sub-10 nm pores prepared from supramolecular interaction facilitated block copolymer assembly are disclosed for example, in Zhu, et al., *J. Membrane Science,* 566(15); 25-34 (2018).

Methods for making self-assembled isoporous block copolymer membranes with tuned pore sizes are disclosed for example, in Yu, et al., *Angew Chem Int Ed Engl.,* 53(38):10072-6 (2014). See also, Madhavan et al., *ACS Appl. Mater. Interfaces,* 6:18497-18501 (2014). Methods for making grade membranes with an isoporous surface are as disclosed for example, in 20140217012, the methods of which are incorporated herein by reference.

ii. Methods of Preparing the OECT

Methods of preparing OECTs with desired configurations are known in the art, for example, photolithography fabrication using a parylene-C peel-off process as described in the examples below and methods described in U.S. Pat. No. 9,530,976 to Ferro, et al., which are incorporated herein by reference.

B. Methods of Using

The disclosed devices can be used to detect the presence of an analyte in a sample for example, a biological sample, suspected of having the analyte. For quantification, the device can be used to generate a dose response curve using known amounts of the analyte of interest. The disclosed device can be operated at a low power. For example, the operation of the disclosed device consumes less than 10 µW power, less than 9 µW power, less than 8 µW power, less than 7 µW power, less than 6 µW power, less than 5 µW power, less than 4 µW power, less than 3 µW power, less than 2 µW power, or less than 1 µW power. In some embodiments, the operation of the disclosed device for detecting the presence of an analyte consumes less than 1 µW power.

Generally, the method of detecting the presence of an analyte in a sample comprising: (i) contacting an electrolyte solution with the device, (ii) applying a drain voltage and a gate voltage, and (iii) measuring a drain current, transconductance, and/or response time. A change (increase or decrease) in drain current, transconductance, and/or response time compared to those measured without the analyte indicates the presence of the analyte in the sample. For example, a decrease in drain current, a decrease in transconductance, and/or an increased response time compared to those measured without the analyte indicates the presence of the analyte in the sample.

The detection relies on the clogging of membrane surface pores by analytes having a larger size relative to the pores, which partially block the ion transport from the electrolyte into the channel. Consequently, a decrease in the total number of ions that can enter the channel and, in their flux (i.e., lower transconductance and slower response time), was measured.

For example, an aliquot of an electrolyte solution containing the suspected analyte or a known amount of the analyte (where a dose response curve is being generated) is introduced into the binding partner functionalized membrane integrated transistors and the reaction between the analyte and its binding partner allowed to occur. The membrane integrated OECT is then rinsed (with PBS for example) and dried (with $N_2$, for example), to remove any non-specific adsorption and non-binding molecules.

In some forms, the sample contains a human or non-human animal bodily fluid, a human or non-human animal tissue, or a combination thereof. Samples including cellular components can be collected and a medium that lyses the cells and dissolves all of the molecular components into solution. The disclosed device can be used to detect the presence of an analyte suspected of being in the collected sample. Examples of analytes include nucleic acids (DNA or RNA) molecule, peptides, proteins, drug molecules, hormones, etc. In some preferred embodiments, the analyte is known to be associated with a particular disease or pathological state, for example, amyloid beta aggregates (associated with AD), prostate surface antigen (elevated levels associated with prostate cancer), circulating tumor cells, etc. In other embodiments, the analyte can be a known toxin to be detected in a sample. Characterization and operation of the device can be carried out as demonstrated in the Examples, incorporated herein (see heading entitled "Characterization and operation of the biosensor", below).

The disclosed methods can be used to detect amyloid fibrils in amyloidoses, an array of human diseases result from misfolding and aberrant assembly of proteins into amyloid fibrils. Amyloidoses are associated with the formation of extracellular amyloid fibrils and/or intracellular amyloid-like inclusions with a cross-β structure. Amyloid diseases include neurodegenerative disorders, such as Alzheimer's, Parkinson's, Creutzfeld-Jacob and Huntington's disease (HD); non-neuropathic localized amyloidoses including type II diabetes mellitus (T2DM), dialysis related amyloidosis and familial amyloid neuropathy; and systemic amyloidoses such as light chain amyloidosis (AL) (Reviewed in Young, et al., *Current Opinion in Chemical Biology*, 39:90-99 (2017).

In a particularly preferred embodiment, the disclosed devices are used for early detection of Alzheimer's disease. In this embodiment, the sample is a biological sample, such as bodily fluid. The bodily fluid can be cerebrospinal fluid; the tissue can be brain tissue. In some forms, the amyloid, plaque, or both, of the proteins or peptides in the sample contains thread-like aggregates of the proteins or peptides, which are ordered in a β-sheet conformation.

Alzheimer's disease (AD) is a neurodegenerative disorder that impairs memory and cognitive functions with a progressive decline of physical and mental fitness. In 2018, more than 45 million people worldwide are estimated to be living with the disease, accounting for an economic cost over 600 billion USD annually due to prolonged care as well as productivity loses. Alzheimer's Disease International, a nonprofit organization, forecasted the number of people diagnosed with AD to triple to ca. 150 million by 2050 (Alzheimer's Disease International, 2018). While there are currently no treatments to stop AD from progressing, early diagnosis is crucial to help the patient to adjust to the symptoms, and benefit from available treatments that can slow down the irreversible damage to healthy cells.

It is now well accepted that the peptide amyloid-β (Aβ) plays a role in the development of AD (LaFerla et al., 2007). From its regular, short-chain polypeptide state (i.e., "the monomer", ca. 40-42 residues in length), Aβ can assemble into various aggregated forms known as oligomers, protofibrils (soluble, elongated aggregates) and fibrils (Hardy et al, 2002). In its monomeric state, Aβ is not neurotoxic; however, the aggregates of Aβ accumulate gradually into plaques in specific regions of the brain. These plaques are believed to be responsible for blocking communication between neurons, leading to neuronal loss, which is the hallmark of AD (Walsh et al., 2002). Currently, the diagnosis of AD is not straightforward and relies mainly on cognitive tests combined with methods that screen for these neurotoxic assemblies of Aβ in the brain or cerebrospinal fluid. To monitor Aβ aggregates and quantify their concentration, fluorescence methods have been commonly utilized (Dalal et al., 2012; Pinotsi et al., 2013).

The disclosed isoporous membrane can be used to detect the presence of Aβ aggregates collected from a subject. In these embodiments, the isoporous membrane used is functionalized with a binding partner selective for Aβ aggregates and the pore size of the isoporous layer should be smaller than the size of the aggregates, for example, has a pore size smaller than 50 nm. Examples of suitable binding partners include Congo red, Thioflavin T. In a particularly preferred embodiment, the device includes a surface functionalized with Congo red, i.e., a ligand with a strong affinity to a cross-β structure of Aβ aggregates. The Congo red-functionalized membrane is integrated with a microscale OECT by interposing it vertically, in between the channel and the electrolyte. As the membrane selectively captures Aβ aggregates in solution, the proteins become immobilized on its surface. With a size larger than that of the membrane pores, the Aβ aggregates block the transport of ions from the electrolyte into the channel, suppressing the gating of the OECT. The OECT signal thus varies depending on the concentration of Aβ aggregates in the solution. This device has demonstrated sensitivity as high as 260 μA/dec and a wide Aβ aggregates detection range from about 2.21 pM to about 221 nM, which is the best performance obtained for an Aβ aggregates sensor. The device shows prolonged shelf life and improved operational stability. In addition, the detection can be performed with a low power consumption, i.e., less than 1 μW power.

Figure 4A:
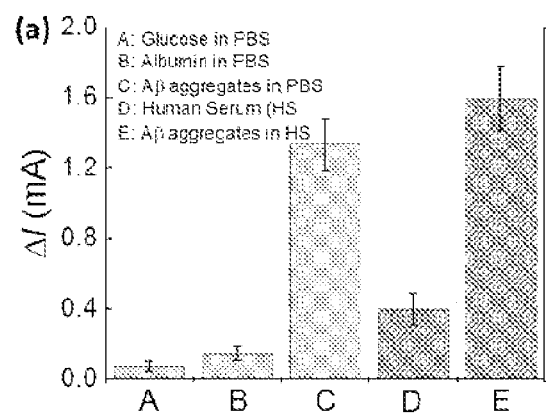
FIGS. 4A-4B show specificity and selectivity of the OECT biosensor in complex media.
Figure 4B:
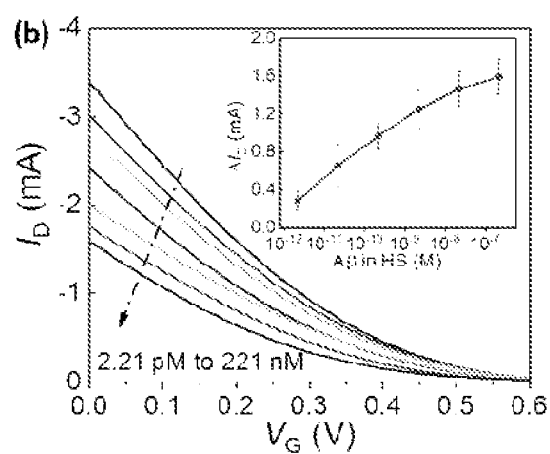
Figure 10:
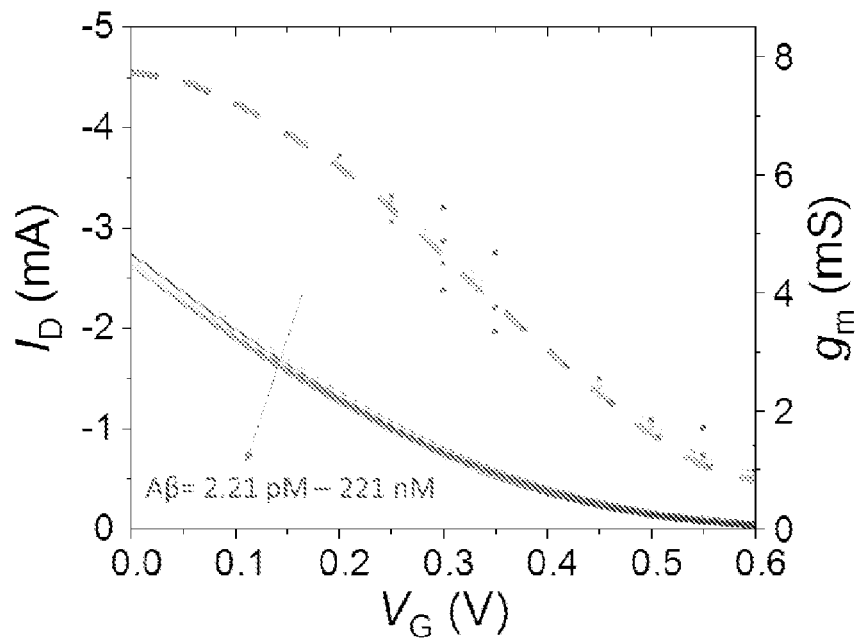
FIG. 10 is a graph showing the transfer curves of OECT containing a PEDOT:PSS channel integrated with microfluidics for the detection of Aβ aggregates.
Figure 11A:
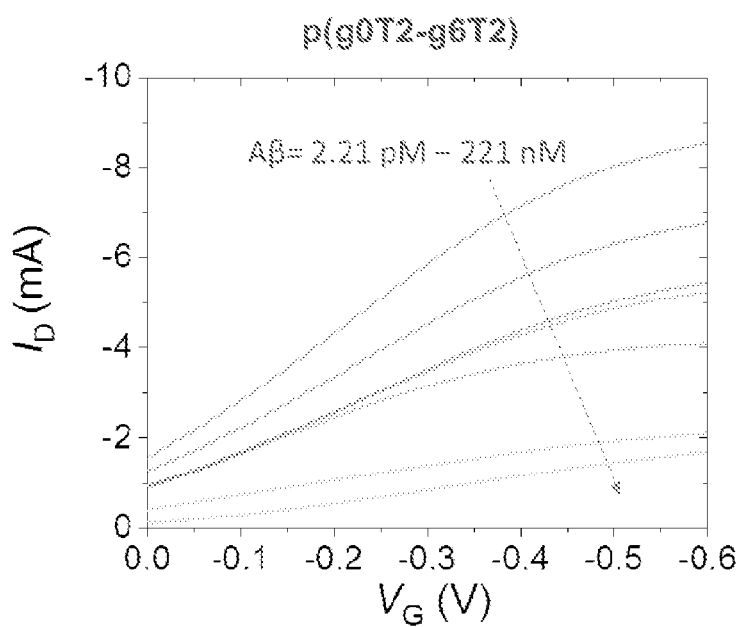
FIGS. 11A-11B are graphs showing the transfer curves of OECT containing p(g0T2-g6T2) channel (FIG. 11A) and OECT containing P-90 channel (FIG. 11B) for the detection of Aβ aggregates.
Figure 11B:
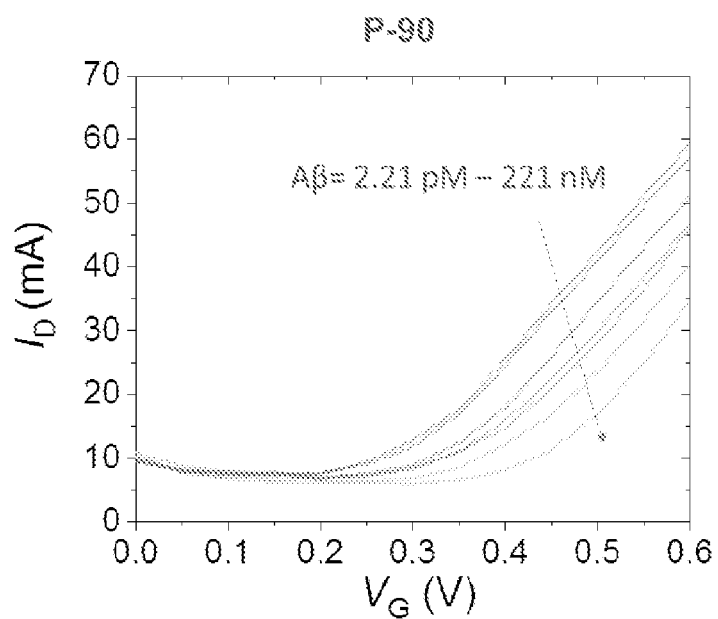

Exemplary transfer curves of OECSs containing PEDOT:PSS channels, OECTs containing p(g0T2-g6T2) channels, and OECTs containing P-90 channels for the detection of Aβ aggregates are shown in FIG. 4B, FIG. 11A, and FIG. 11B, respectively. Exemplary transfer curves of OECT containing a PEDOT:PSS channel integrated with microfluidics for the detection of Aβ aggregates are shown in FIG. 10.

The disclosed devices, and methods can be further understood through the following numbered paragraphs.

1. A devices for detecting an analyte in a sample suspected of containing the analyte, comprising an isoporous membranes (BNIM) and an organic electrochemical transistor (OECT), wherein the BNIM comprises a binding partner specific for the analyte.
2. The device of paragraph 1, wherein the OECT comprises a source electrode, a drain electrode, a channel, and a gate electrode, wherein the source and drain electrodes are electrically connected by the channel.
3. The device of paragraph 1 or 2 comprising a supporting substrate, wherein the source electrode, the drain electrode, and the channel are patterned on the supporting substrate.
4. The device of paragraph 3, wherein the substrate is selected from the group consisting of glass, silicon, paper, coated paper, resin-coated paper, paper laminates, paperboard, and corrugated board.
5. The device of any one of paragraphs 2-4, wherein the channel is made from a conducting polymer.
6. The device of paragraph 5, wherein the conducting polymer is selected from the group consisting of PEDOT:PSS, PEDOT-S, PEDOT:TOS, PEDOTOH:$ClO_4$, PEDOT-co-PEDOTOH:$ClO_4$, P3HT, PTHS, BBL, p(g2T-TT), PTHS$^-$TMA$^+$-co-P3HT, p(gNDI-g2T), p(g0T2-g6T2), and P-90.
7. The device of any one of paragraphs 1-6, wherein the isoporous membrane is made from the block copolymer poly(styrene-b-4-vinylpyridine).
8. The device of any one of paragraphs 1-7, wherein the binding partner specific for the analyte is smaller in size compared to the pore size of the isoporous surface of the membrane.
9. The device of any one of claims 1-8, wherein the device comprises Congo Red or Thioflavin T.
10. The device of any one of paragraphs 1-8, wherein the isoporous membrane comprises an aptamer, optionally a peptide aptamer.
11. The device of any one of paragraphs 1-10, wherein the binding partner for the analyte is crosslinked to the isoporous surface of the membrane.

12. The device of any one of paragraphs 1-11, wherein the BNIM is placed above the channel and in contact with the source and drain electrodes.
13. A method of detecting the presence of an analyte in a sample comprising
    (i) contacting an electrolyte solution with the device of any one of claims 1-12,
    (ii) applying a drain voltage and a gate voltage, and
    (iii) measuring a drain current, transconductance, and/or response time,
    wherein a decrease in drain current, a decrease in transconductance, and/or an increased response time compared to those measured without the analyte indicates the presence of the analyte in the sample.
14. The method of paragraph 13, wherein the electrolyte solution comprises or is a biological sample.
15. The method of paragraph 14, wherein the biological sample is selected from the group consisting of blood, serum, cerebrospinal fluid, and saliva.
16. The method of any one of paragraphs 13-15, wherein the BNIM of the device is interposed vertically, in between the channel and the electrolyte solution.
17. The method of any one of paragraphs 13-16, wherein the BNIM of the device comprises Congo Red.
18. The method of any one of paragraphs 13-17, wherein the electrolyte solution comprises or is suspected of comprising amyloid beta aggregates.
19. The method of any one of paragraphs 13-18, wherein the electrolyte solution comprises a known concentration amyloid beta aggregates, the method further comprising generating a dose response curve.
20. The method of any one of paragraph s 13-19, comprising quantifying the amount of amyloid beta in a sample suspected of containing amyloid beta by comparing the decrease in current obtained as a result of binding of amyloid beta in a sample suspected of containing amyloid beta to Congo red on the isoporous membrane, to the dose response curve.

Examples

Experimental Methods
Materials

The block copolymer poly(styrene-b-4-vinylpyridine) (P10900-S4VP, 188000-b-64000 g/mol) was purchased from Polymer Source, Inc., Canada. Dimethylformamide, 1,4-dioxane, acetone, 4-chloro-1-butanol, ethanol (EtOH), (3-aminopropyl)triethoxysilane (APTES), glutaraldehyde (GA), Congo red (CR), ethylene glycol (EG), dodecyl benzene sulfonic acid (DB SA), (3-glycidyloxypropyl) trimethoxysilane (GOPS), ammonium hydroxide, human serum from human male AB plasma and phosphate buffered saline (PBS) were purchased from Sigma-Aldrich. The conducting polymer poly(ethylenedioxythiophene):poly (styrenesulfonate) (PEDOT:PSS, PH1000) aqueous solution was purchased from Heraeus Clevios GmbH, the recombinant human amyloid β 1-42 peptide (#ab82795) from Abcam (Cambridge, MA, USA), and glass beads from Polysciences, Inc. All aqueous solutions were prepared with ultrapure water (Milli-Q, Millipore).

Functionalization of the Nanoporous Membrane

The pristine nanoporous membrane was prepared from the block copolymer poly(styrene-b-4-vinylpyridine), PS-b-P4VP, according to the procedure described in Madhavan et al., *ACS Appl. Mater. Interfaces*, 6:18497-18501 (2014). This process is known as self-assembly and non-solvent-induced phase separation of block copolymers.

To covalently attach the recognition units on the membrane surface, the first step involved the quaternization of the 4VP block using 4-chlorobutan-1-ol. The membrane was immersed in a 2.5% (v/v) solution of 4-chlorobutan-1-ol in ethanol in a beaker at room temperature for 24 h. The membrane was taken out and washed with water. The quaternized membranes were then exposed to a 5% (v/v) solution of (3-aminopropyl)triethoxysilane (APTES) in water for 30 minutes, followed by rinsing with ultrapure water. The next step was the immobilization of Congo red molecules on the quaternized membrane using glutaraldehyde (GA) as the crosslinker. T amine-terminated membranes were immersed in 5% (w/v) GA solution for 30 min and then rinsed with PBS and dried with $N_2$ spray. Congo red was conjugated onto the GA functionalized membrane surface by incubating the membrane in its solution (1 μg/mL) for 1 h Finally, the membrane was gently rinsed with PBS and dried with $N_2$ spray to remove any low molecular weight and unreacted molecules from the surface.

Surface Characterization of the Membrane

Field emission scanning electron microscopy (FESEM) using FEI Magellan™ SEM were performed, at an accelerating voltage of 5 kV with 160000× magnifications. An atomic force microscopy (AFM) analysis was carried out with a Bruker Dimension Icon SPM in the resonance frequency range of 76-263 kHz under tapping mode. X-ray photoelectron spectroscopy (XPS) analysis was conducted using an AMICUS/ESCA 3400 KRATOS instrument equipped with an achromatic Al Kα X-ray source (1468.6 eV). The source was operated at a voltage of 10 kV and a current of 10 mA. The elemental narrow scan region was acquired with a step of 0.1 eV. The obtained spectra was calibrated using the reference C is at 284.8 eV. The spectra was deconvoluted using Gaussian and Lorentzian methods and out background subtraction was performed using the Tougaard method.

Fabrication of the Organic Electrochemical Transistor (OECT)

A Parylene-C peel-off process was used to photo-lithographically fabricate the OECTs, with a channel width of 100 μm and a channel length of 10 μm, on a glass substrate, the process of which is shown in FIG. 7A-7E. Briefly, the fabrication starts with sputtering to deposit chromium (10 nm)/gold (100 nm) on glass wafers. The metal was patterned via a lift-off process using a bilayer resist structure (S1813 photoresist, Microchemicals GmbH; LOR 5B MicroChem Corp. Westborough, MA). Lift-off was performed in appropriate solvents followed by the encapsulation of the wafer in Parylene C via vaporization of the dimer (PDS 2010 Labcoater 2, Specialty Coating Systems, Indianapolis, Ind.). An anti-adhesion layer was spin-coated on the encapsulated wafer for the deposition of a sacrificial Parylene C layer, which allows for the patterning of the polymer in the desired channel geometry. The metal contacts and the channels were finally exposed using reactive ion etching with $O_2$ (Plasma lab 100-ICP 380, Oxford Instruments). A PEDOT:PSS dispersion containing EG, DBSA and GOPS was then spin-coated to form the channels. After peeling off the sacrificial Parylene C layer, the devices were annealed at 140° C. for 1 h and soaked in DI water overnight.

Preparation of Amyloid-β Monomer and Aggregate Solutions

The protein was dissolved in 10 mM PBS containing 0.5% ammonium hydroxide for a final concentration of 2.21 μM. This stock solution was diluted with PBS to the required concentrations in the range of 2.21 pM to 221 nM. For the growth of the peptide (monomer) into an aggregate form, the solutions were incubated at 37° C. for 3 days and then stored them at −20° C. For sensing experiments, 30 µL of the corresponding Aβ solution was dropped onto the CR functionalized membrane integrated transistors and the reaction between the Aβ and CR was allowed to occur for 3 hours. The membrane integrated OECT was then rinsed with PBS and dried with $N_2$ to remove any non-specific adsorption and non-binding molecules.

Characterization of the OECT and Operation of the Biosensor

Cyclic voltammetry (CV) and electrochemical impedance spectroscopy (EIS) measurements were performed using a potentiostat (Metrohm Autolab) with a three-electrode configuration: the PEDOT:PSS channel of the OECT as the working electrode, a Pt mesh as the counter electrode and an Ag/AgCl as the reference electrode. The electrolyte solution was a PBS (0.01 M) solution containing 10 mM $K_3Fe(CN)_6$. The OECT performance was evaluated using a National Instruments-PXI digital multimeter controlled by a customized LabView program. The steady-state measurements of the OECTs were carried out by acquiring channel current ($I_D$) vs. drain voltage ($V_D$) at gate voltages ($V_G$) varying in between 0 and 0.6 V (step 0.05 V). The sensor response was determined from the transfer characteristics ($I_D$ vs. $V_G$ at a pre-set $V_D$=−0.6 V). The change in $I_D$ was calculated at $V_G$=0 V as the device was operated in solutions containing different Aβ concentrations. The quantification of current changes was calculated by subtracting the current at blank buffer and serum samples from the current at a specific concentration. All electrical measurements were carried out under ambient conditions and inside a grounded Faraday cage.

Results and Discussion

Design of the Functional Membrane

Figure 1B:
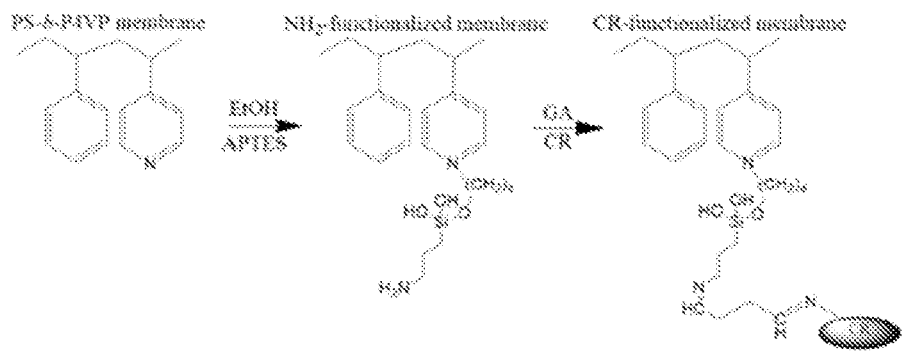

The key element of this sensor is the nanostructured isoporous membrane (PS-b-P4VP) functionalized with Congo red (CR) molecules. This isoporous membrane is easily manufactured via self-assembly copolymerization and non-solvent induced phase separation (Madhavan, et al. 2014) (data not shown) with an average nanopore size of about 50 nm (FIG. 1A). The immobilization of CR is a crucial step for selective and sensitive detection of Aβ aggregates. CR was selected as the recognition unit due to its stability in various media and strong affinity to Aβ aggregates (Nilsson, 2004; Pedersen et al., 2013). FIG. 1B displays the molecular structure of the polymer membrane and its functionalization route for immobilizing the CR. The functionalization of the nanostructured isoporous membrane was initiated by modification of the membrane with 3-aminopropyltriethoxysilane (APTES) to provide amino terminated groups on the surface. This was followed by reacting these groups with the bi-functional linker glutaraldehyde (GA). GA conjugates with the amino groups from the surface as well those of CR on the other end (Wustoni et al., 2015).

Figure 1C:
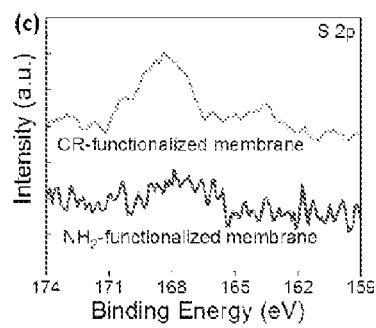

To verify the presence of CR on the membrane surface and analyze the surface after each modification step, XPS studies were performed. The high-resolution of S2p, O1s and N1s spectra of the surface after APTES modification and upon CR immobilization reveal significant differences in the chemical composition of the membrane surfaces. A characteristic peak is observed on the S2p spectrum of the membrane only after the CR functionalization (FIG. 1C), i.e., a fingerprint of CR molecules that contain sulfur atoms on the —$SO_3$ functional groups in their structure. In the N1s spectra shown in FIG. 1d, the $NH_2$-functionalized membrane displays two deconvoluted peaks at 398.5 eV and 399.2 eV that belong to the nitrogen atoms in the terminal amino group of APTES and pyridine unit, respectively (Barber et al., 1973). Upon CR addition, an additional small peak is observed at 399.8 eV, which corresponds to an $\underline{N}$=$\underline{N}$ bond of diazenyl functional group from the CR molecule (Camalli et al., 1990) (Table 1).

TABLE 1

Figure 1D:
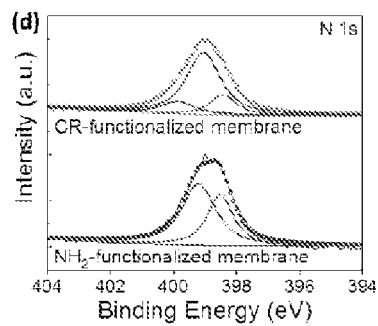

Deconvolution of XPS N 1s spectra shown in FIG. 1d and S5e for the membrane functionalized with NH2 and then CR, as well as after the interactions of the latter with Aβ aggregates (Castle et al., 1984; Oswald, et al., 2013).

| Bonds of interest | | $NH_2$-functionalized membrane | CR-functionalized membrane | After Aβ binding |
|---|---|---|---|---|
| —$\underline{N}H_2$ in APTES | B.E. (eV) | 398.511 | 398.418 | 398.600 |
| | FWHM (eV) | | 0.975 | |
| —$\underline{N}R_2$ in Pyridine | E.B. (eV) | 399.195 | 399.046 | 399.100 |
| | FWHM (eV) | | 1.292 | |
| $R_1$-$\underline{N}$=$\underline{N}$-$R_2$ | E.B. (eV) | — | 399.852 | 399.900 |
| | FWHM (eV) | | 1.288 | |
| —$\underline{N}H^+$ | E.B. (eV) | — | — | 399.405 |
| | FWHM (eV) | | 0.803 | |
| —$\underline{N}H_3^+$ | E.B. (eV) | — | — | 400.394 |
| | FWHM (eV) | | 1.850 | |

Figure 1E:
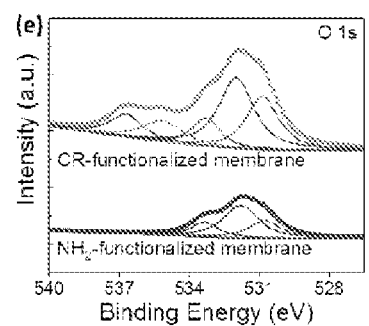

Further evidence of the CR presence on the surface comes from the O1s spectra (FIG. 1E). For the $NH_2$-functionalized membrane, three peaks were deconvoluted at 530.8 eV, 531.8 eV, and 533.3 eV, assigned for $\underline{O}$—H, $\underline{O}$—Si, $\underline{O}$—C, bonds, respectively (Barr, 1983). Upon immobilization of the CR, new peaks at 535.1 eV and 536.7 eV appear, ascribed to the oxygen in the —$SO_3$ groups of CR (Table 2).

TABLE 2

Deconvolution of XPS O 1s spectra shown in FIG. 1e and FIG. S5f for the functionalized with NH2 and then CR, as well as after the interactions of the latter with Aβ aggregates.

| Bonds of interest | | NH2-functionalized membrane | CR-functionalized membrane | After Aβ binding |
|---|---|---|---|---|
| $\underline{O}$—H | E.B. (eV) | 530.767 | 530.862 | 530.9 |
| | FWHM (eV) | | 1.661 | |
| $\underline{O}$—Si | E.B. (eV) | 531.793 | 531.98 | 531.8 |
| | FWHM (eV) | | 1.788 | |
| $\underline{O}$=C—$\underline{O}$ | E.B. (eV) | | | 532.625 |
| | FWHM (eV) | | 0.94 | |
| $\underline{O}$—C | E.B. (eV) | 533.34 | 533.283 | 533.3 |
| | FWHM (eV) | | 1.433 | |
| —S$\underline{O}_3$ | E.B. (eV) | | 535.163 | 534.96 |
| | FWHM (eV) | | 2.079 | |
| —S$\underline{O}_3$ | E.B. (eV) | | 536.699 | 536.237 |
| | FWHM (eV) | | 1.674 | |

Figure 1F:
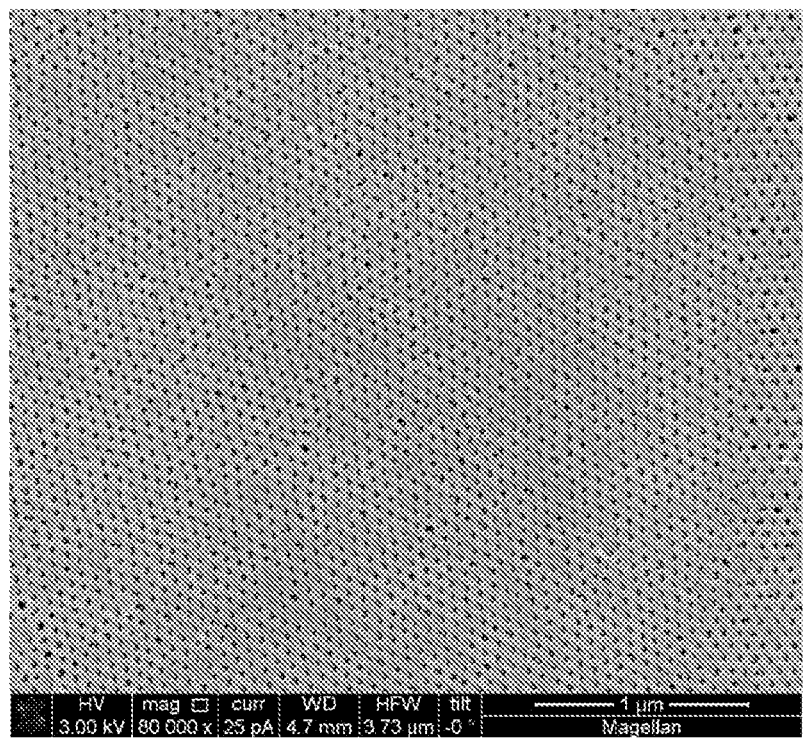
FIG. 1F is an SEM image of isoporous membrane after modification with congo red.

The in-depth XPS characterization proves that the membrane surface has been successfully modified, first with APTES and then with CR. Importantly, after the modification with CR, the membrane maintains its porosity (FIG. 1F).

OECT-Based Sensor for the Detection of Aβ Aggregates

Figure 2A:
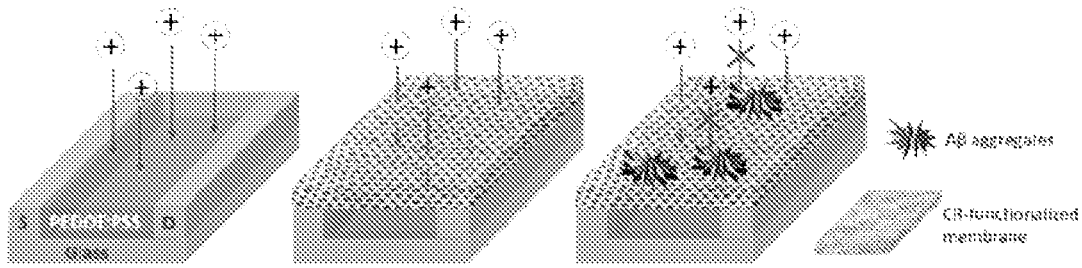
FIGS. 2A-2C show the OECT biosensor configuration and characteristics.
Figure 2B:
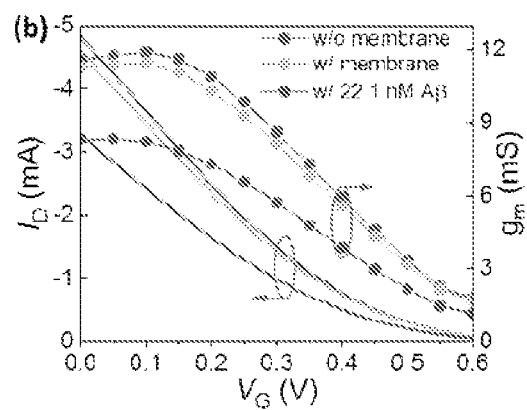

To understand the operation mechanism of the disclosed sensor, it is crucial to understand how a depletion mode OECT works. In this device, a PEDOT:PSS film was used in the channel cast between source and drain contacts, and an Ag/AgCl pellet as the top gate electrode immersed into the measurement solution (FIG. 2A, left). In the absence of gate voltage ($V_G$), a high source-drain current ($I_D$) flowing in the channel is recorded due to the conducting nature of PEDOT:

PSS. A positive voltage at the gate electrode ($V_G$) drifts the cations of the electrolyte into the channel, while anions move towards the gate electrode. $I_D$ decreases with an increase in $V_G$ and the gain of the device (transconductance) is maximized when $V_G$ is ca. 0.1 V (FIG. 2B). This is the result of the vertical drift and penetration of cations into the channel and the subsequent depletion of holes therein.

Figure 2C:
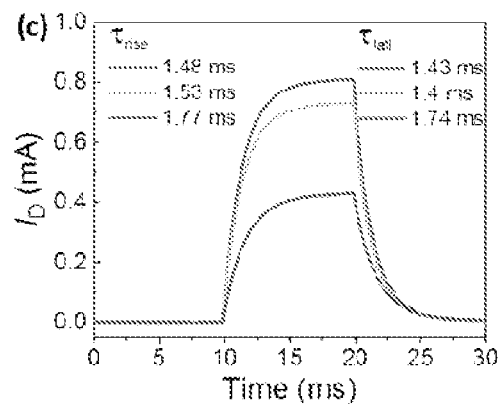
Figure 2D:
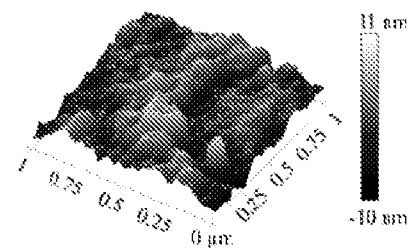
FIGS. 2D-G show surface characterization of the sensing layer upon binding events.
Figure 2E:
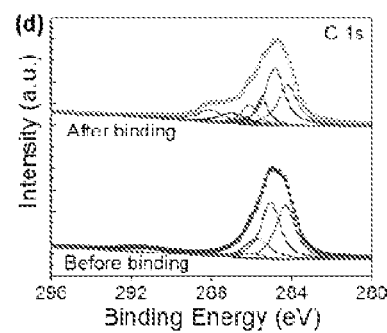
Figure 2F:
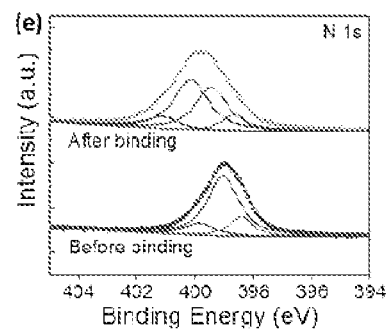
Figure 2G:
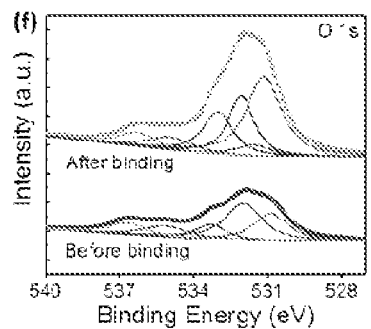
Figure 2H:
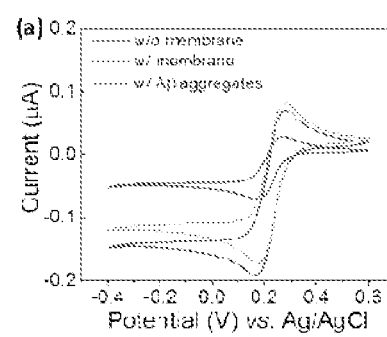
FIGS. 2H-2J show CV curve (FIG. 2H), phase of impedance (FIG. 2I), and Nyquist plot of the PEDOT:PSS channel (FIG. 2J), before the addition of the membrane (w/o membrane), after addition of functional membrane (w/membrane) and upon adsorption of analyte on the latter (w/ Aβ aggregates). CV curves and impedance electrochemical spectra were acquired in PBS (pH 7.4) containing 10 mM $(Fe(CN)_6)^{3-}$.
Figure 2I:
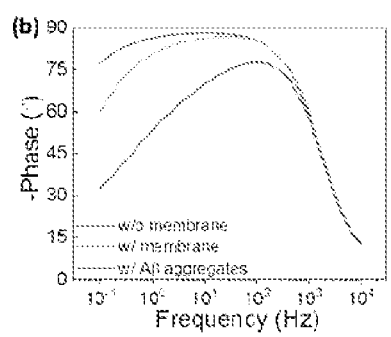
Figure 2J:
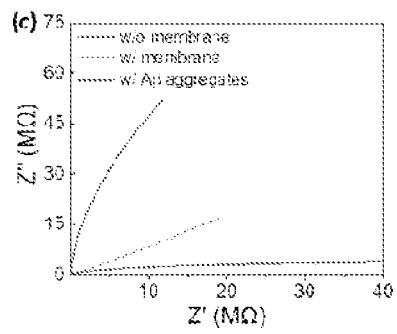
Figure 2K:
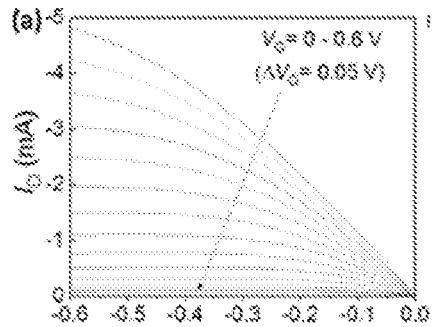
FIGS. 2K-2M show output characteristics of the OECTs before (FIG. 2K) and after (FIG. 2L) integration of the CR-functionalized membrane and, (FIG. 2M) after binding events with Aβ aggregates. The electrolyte is 10 mM PBS and the gate electrode is Ag/AgCl.
Figure 2L:
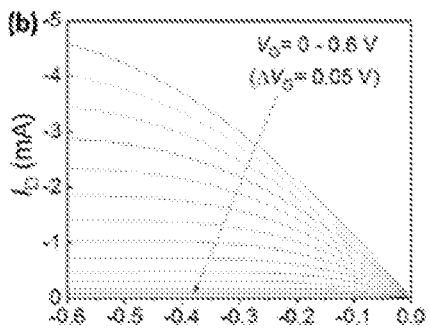
Figure 2M:
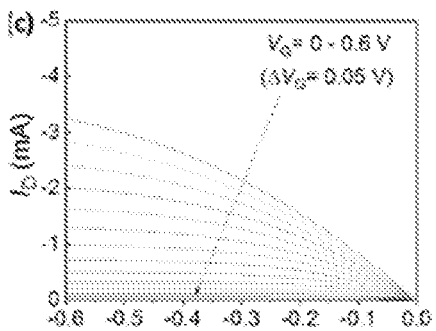

The configuration of the disclosed OECT biosensor involves the functionalized membrane placed on top of the PEDOT:PSS channel (FIG. 2A, middle). The device is then covered with a drop of electrolyte (PBS) and an Ag/AgCl top gate is immersed in it. The presence of the membrane does not interfere with the OECT operation: due to its porous nature, the membrane is permeable to electrolyte ions, thus allowing for efficient gating of the channel. However, when operating the membrane-integrated device in a solution containing Aβ aggregates (22.1 nM, no change in ionic strength), a substantial decrease in channel current was observed as well as the transconductance (FIG. 2B). This effect is more pronounced at low gate voltages. The latter is expected as the electrophoretic force on the ions is less at low bias, and thus there are fewer ions penetrating into the channel. The respective output characteristics of the OECTs at each stage are shown in FIGS. 2K-M.

The binding events affect also the transient characteristics of the device. For the transient response, the change in $I_D$ upon application of a square-shaped pulse at the gate electrode ($V_G$=0.1 V, 15 ms) was recorded. The response times are then calculated from these transients shown in FIG. 2C, which gives the time for how fast the channel will be de-doped (doped) by injected (extracted) cations. The presence of the membrane on top of the channel decreases the current slightly with a negligible change in response time. On the other hand, upon incubation of the membrane with Aβ aggregates, the device switches ON and OFF more slowly, accompanied by a significant decrease in the current modulation. While the $I_D$ in steady-state is proportional to the number of ions that can enter the film, the speed of the transistor is governed by the ionic flux (Jimison et al., 2012). Since the Aβ interactions with the CR is not electrochemically active and cannot directly induce an electrical signal, it is clear that the device characteristics are modulated by the permeability of the membrane.

The changes in the AFM and XPS spectra of the membrane upon interactions with Aβ aggregates evidence that CR units capture the protein aggregates which then adsorb on the membrane surface (data not shown and FIGS. 2D-G, Tables 1-2). The membrane was designed such that its pore size (i.e., ca. 50 nm) is smaller than that of Aβ aggregates (e.g. protofibrils) (Ochiishi et al., 2016; Wolff et al., 2017). The adsorbed protein aggregates thus clog the membrane pores and block partially the cation transport from the electrolyte into the channel (FIG. 2A, right). Consequently, a decrease in the total number of ions that can enter the channel and, in their flux (i.e., lower transconductance and slower response time), was measured.

Cyclic voltammetry (CV) and electrochemical impedance spectroscopy (EIS) measurements (FIGS. 2H-J) were further performed. The same OECT channels were used with and without the membrane and after Aβ incubation in an electrolyte containing the redox active molecule $K_3Fe(CN)_6$ to evaluate the kinetic barrier on the channel/electrolyte interface (Cardoso et al., 2016). The results show that after incubation with Aβ aggregates, the peak currents decrease drastically, indicating that $Fe^{3+}$ movement towards the channel is hindered. In addition, the channel capacitance decreases accompanied with an increase in charge transfer and electrolyte resistance due to a drop in the ion diffusion ability.

Figure 5A:
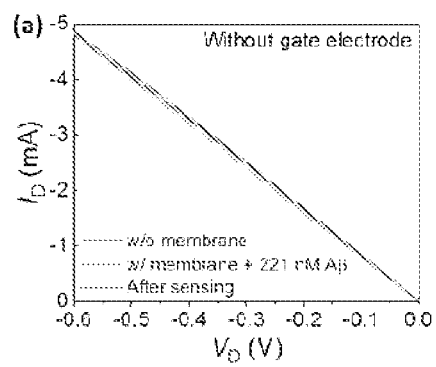
FIGS. 5A-5D show the current of a PEDOT:PSS film flowing between source and drain contacts of the transistor channel. Identical currents were observed before (w/o membrane) and after the integration of the membrane as well as after sensing measurements were performed with Aβ aggregates (FIG. 5A). The current of the channel does not change after its integration with three different membranes. The membranes were disassembled one after the other once the device have been operated and I-V curves have been obtained (FIG. 5B). The operational stability of a typical OECT (FIG. 5C) and a membrane integrated OECT (FIG. 5D) upon continuous square-shaped pulses for more than 15 minutes.
Figure 5B:
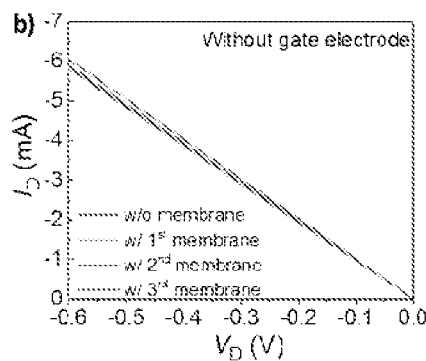
Figure 5C:
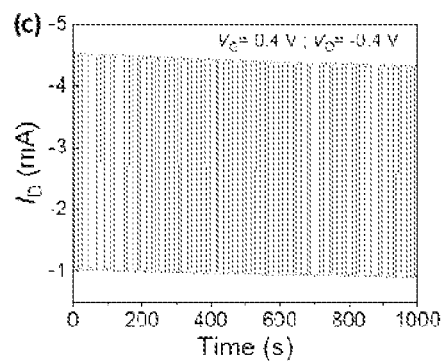
Figure 5D:
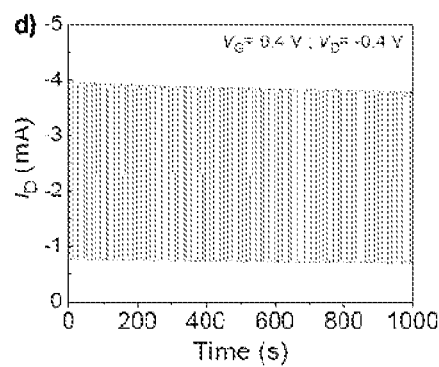

A feature of this device configuration is its prolonged shelf life and operational stability. This is because the sensing event is compartmentalized. The binding events happen in the functionalized membrane that can be replenished when needed, while the electronic device underneath is kept "pristine" so as to maintain its function for further use. As such, the device is expected to have significantly longer shelf life than other sensors that rely on biofunctionalized electronic elements. As shown in FIG. 5A, the current flowing in the PEDOT:PSS channel is identical before and after the integration with the membrane, as well as after the device has been used for Aβ sensing. The same OECT can then be integrated with fresh membranes for new sensing measurements (FIG. 5B). This configuration is also cost effective because for this particular sensor, the OECT chip requires more sophisticated fabrication procedures than the membrane. Moreover, the membrane-integrated OECT has operational stability similar to a bare OECT, i.e., the device shows stable drain current output when stressed with 5 s long, continuous square-shaped pulses at the gate electrode for more than 15 minutes (FIGS. 5C-D).

Sensitivity of the Biosensor

Figure 3A:
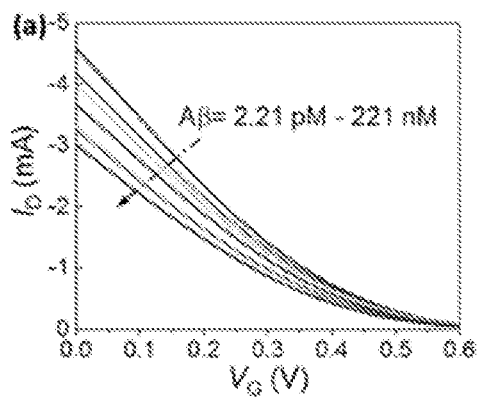
FIGS. 3A-3C show dose curves and the specificity of the sensor towards Aβ aggregates. Transfer characteristics of the OECT channel integrated with a CR-functionalized membrane (FIG. 3A) and a bare PS-b-P4VP membrane (FIG. 3B). Each membrane was exposed to Aβ aggregate solutions of varying concentrations (from 2.21 pM to 221 nM).
Figure 3B:
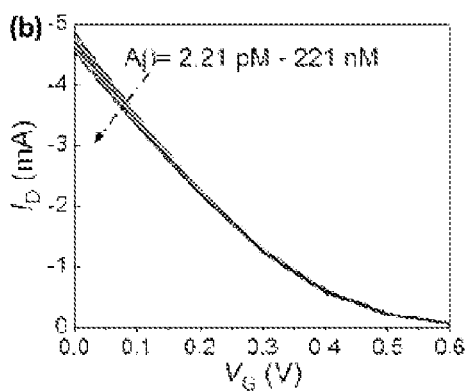

In the experiments above, the device response was tested only to a particular Aβ aggregate concentration. FIGS. 3A and B show the steady-state characteristics of an OECT channel integrated with a CR-functionalized membrane, and with a bare PS-b-P4VP membrane incubated with Aβ solutions of a broad range of concentrations, respectively. The transfer curve of the functionalized membrane integrated OECT shows a continuous decrease in the drain current with an increase in Aβ aggregate concentration (FIG. 3A). The unfunctionalized bare membrane, on the other hand, has no specific interactions with Aβ aggregates, leading to a similar device response independent of protein concentration (FIG. 3B).

Figure 3C:
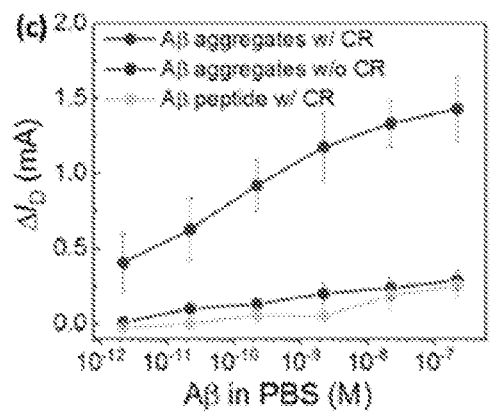

FIG. 3C demonstrates the calibration curve of the biosensor (the current change vs the logarithm of Aβ concentration), showing a linear response towards the Aβ aggregates in the range of 2.21 pM to 221 nM. The slope of the linear relationship between is 260 µA/dec for the functionalized membrane. The sensitivity of the device outperforms the previously reported electrochemical systems thanks to the high transconductance endowed by the OECT circuitry, as summarized in Table 3.

TABLE 3

Comparison of the OECT biosensor with other electrochemical Aβ sensors.

| Methods | Materials | Linear Range | Sensitivity | References |
|---|---|---|---|---|
| Amperometric | Antibody-modified gold electrode | 0.5 to 50 nM | 0.327 µA/nM | Liu et al., 2014 |
| Cyclic voltammetry | AFPPcys | 0.1 to 5 µM | 0.4 µC/µM | Fujii et al., 2015 |
| Voltammetric | Ferrocene capped nanoparticle | 0.1 to 5 pM | 0.8 µA/pM | Lu et al., 2018 |
| Voltammetric | HRP-Au-gelsolin nanohybrid | 0.1 to 50 nM | 0.25 µA/nM | Yu et al., 2015 |

TABLE 3-continued

Comparison of the OECT biosensor with other electrochemical Aβ sensors.

| Methods | Materials | Linear Range | Sensitivity | References |
|---|---|---|---|---|
| Voltammetric | ALP-PrP (95-110) antibody | 5 pM to 2 nM | 0.178 μA/nM | Liu et al., 2015 |
| Voltammetric | Aptamer and AuNPs | 0.5 to 30 nM | 0.159 μA/nM | Zhou et al., 2016 |
| Voltammetric | CNT-antibody | 0.2 to 40 ng/mL | 10.37 μA/dec | Yu et al., 2019 |
| Amperometric | Graphene EGOFET | 0.1 to 50 nM | 2 nA/nM | Kuo et al., 2018 |
| Amperometric | PEDOT:PSS OECT | 2.21 pM to 221 nM | 260 μA/dec | This work |

To rule out the possibility of the membrane also interacting with the Aβ monomers, the device sensitivity to a broad range of concentrations of the peptide was monitored. The negligible change in channel conductance with the peptide confirms the selectivity of the sensor to the aggregate form of the protein. Accordingly, when the membrane is incubated with Aβ monomers, its surface morphology does not change (data not shown). CR molecules capture the aggregate form that contains cross-β structure conformation whereas they cannot bind effectively to the peptide with α-helix-rich structure (Wu et al., 2007; Wu et al., 2012). Likewise, the device is not sensitive to Aβ aggregates if the membrane does not carry CR units. These results demonstrate the key role of the CR units to capture the Aβ aggregates and identify the physical state of the proteins.

Operation in Complex Media

Figure 6:
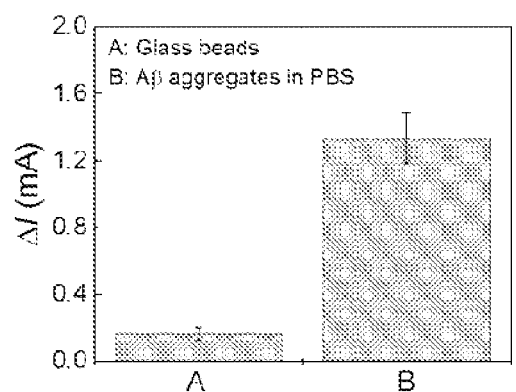
FIG. 6 shows the OECT response to the glass beads (0.1 μg/mL) and Aβ aggregates (22.1 nM) in PBS. Error bars represent the SD of data collected from three channels.

Aβ aggregates are reported to be released into blood plasma (De la Escosura-Muñiz et al., 2015). The detection of Aβ aggregates in human serum samples could offer a convenient, non-invasive and low-cost option for in vitro monitoring of AD. To test the performance of the sensor in complex media, complex media was emulated conditions using commonly interfering species such as glucose, hemoglobin, cholesterol and human serum albumin proteins, and evaluated the sensor performance therein as well as in human blood serum (HS). FIG. 4a shows a comparison of the OECT response to the interferents in PBS, which are insignificant compared to the response to Aβ aggregates. While the HS, which contains a considerable number of biomolecules, generates a background response, this does not hinder the device response to Aβ aggregates. Further studies then examined the sensor performance to monitor Aβ aggregates in human serum samples present at different concentrations Similar to the dose-dependent response of the device recorded in PBS (FIG. 3A), the OECT current decreases linearly with an increase in the concentration of Aβ aggregates in HS (FIG. 4B). The device is also not responsive to molecules which can clog the membrane pores because of their size, further evidencing that the specific interactions of Aβ aggregates with CR is essential for their detection (FIG. 6).

CONCLUSION

In this work, a bio-functional, nanostructured, isoporous membrane integrated OECT for the rapid and sensitive detection of Aβ protein aggregates is developed. The Congo red units anchored on the membrane surface enables selective capture of Aβ aggregates. The membrane is placed on top of the OECT channel. As the aggregates are larger than the size of membrane pores, once they are captured by the membrane, they block the drift of electrolyte cations into the channel during the OECT operation. The drain current is thus modulated in correlation with the amount of aggregates adsorbed from the electrolyte. We, therefore, combine three concepts to build this state-of-the-art sensor: 1) biomolecular interactions of Congo red only with Aβ aggregates; 2) the size-selective blockage of the ion pathways; 3) high sensitivity of the OECT channel to electrolyte cations. The use of a CR-functionalized membrane as the recognition unit has several advantages: the sensor has long term stability, ease of use, and low-cost compared to antibodies or enzymes. Due to the isoporosity and selectivity of the membrane, the data shows in particular that neither Aβ monomers nor physically adsorbed Aβ aggregates influence the ion injection, rendering the sensor highly specific to Aβ aggregates. The label-free protein sensor linearly detects the Aβ aggregates from 2.21 pM to 221 nM in the buffer and human serum sample, in the range of standard physiological concentrations. Considering the selectivity and sensitivity of this sensing approach, this work paves the way for advanced electronic platforms for early diagnosis of AD. In addition, this work can inspire the use of porous membranes functionalized with biomolecules and their integration with miniaturized, high transconductance transistors.

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention described herein. Such equivalents are intended to be encompassed by the following claims.

REFERENCES

Alzheimer's Diseases International, World Alzheimer Report 2018, https://www.alz.co.uk/research/WorldAlzheimerReport2018.pdf?2, accessed on 13 Mar. 2019.
Barber, et al. 1973, *J. Chem. Soc., Faraday Trans.* 2, 69, 551-558.
Barr, 1983, *Appl. Surf. Sci.* 15 (1), 1-35.
Camalli, et al., 1990, *Inorganica Chim. Acta* 170 (2), 225-231.
Cardoso, et al., 2016, *Biosens. Bioelectron.* 80, 621-630.
Dalal, et al., 2012, *J. Phys. Chem. Lett.* 3 (13), 1783-1787.
De la Escosura-Muñiz, et al., 2015, *Biosens. Bioelectron.* 67, 162-169.
Fu, et al., 2017, *Adv. Mater.* 29 (41), 1703787.
Ghittorelli, et al., 2018, *Nat. Commun.* 9 (1), 1441.
Gualandi, et al., 2016, *Sci. Rep.* 6, 35419.
Hardy, et al., 2002, *Science* 297, 353-356.
He, et al., 2012, *J. Mater. Chem.* 22 (41), 22072-22076.
Jimison, et al., 2012, *Adv. Mater.* 24 (44), 5919-5923.
Kim, et al., 2010, *Biosens. Bioelectron.* 25 (11), 2477-2482.
LaFerla, et al., 2007, *Nature Rev. Neurosci.* 8, 499-509.
Liu, et al., 2014, *Biosens. Bioelectron.* 51, 208-212.
Lopes, et al., 2014, *Nanoscale* 6 (14), 7853-7857.
Macchia, et al., 2018, Flex. Print. Electron. 3, 034002.
Madhavan, et al., 2014, *Appl. Mater. Interfaces*, 6, 18497-18501.

Mariani, et al., 2018, *ACS Appl. Mater. Interfaces* 10, 22474-22484.
Nilsson, 2004, *Methods* 34, 151-160.
Ochiishi, et al., 2016, *Genes Cells* 21 (2), 200-211.
Pappa, et al., 2018, *Sci. Adv.* 4 (6), eaat0911.
Parlak, et al., 2018, *Sci. Adv.* 4 (7), eaar2904.
Pedersen, et al., 2013, *Anal. Chem.* 85, 4215-4227.
Pinotsi, et al., 2013, *Chem Bio Chem* 14 (7), 846-850.
Rivnay, et al., 2018, *Nat. Rev. Mater.* 3, 17086.
Schöneich, et al., 2003, *J. Am. Chem. Soc.* 125, 13700-13713.
Sessolo, et al., 2014, *Adv. Mater,* 26 (28), 4803-4807.
Suprun, et al., 2016, *Electrochem. Commun.* 65, 53-56.
Vas, et al., 2001, *Alzheimer's Disease: The Brain Killer, World Health Organization.*
Vestergaard, et al., 2005, *J. Am. Chem. Soc.* 127 (34), 11892-11893.
Walsh, et al., 2002, *Nature* 416, 535-539.
Wang, et al., 2019, *Acc. Chem. Res.* 52 (2), 277-287.
Wolff, et al., *Sci. Rep.* 7 (1), 2493.
Wu, et al., 2012, *Biophys. J.* 103 (3), 550-557.
Wu, et al., 2007, *J. Am. Chem. Soc.* 129(5), 1225-1232.
Wustoni, et al., 2015, *Biosens. Bioelectron.* 67, 256-262.
Wustoni, et al., 2019, *Adv. Mater. Interfaces* 6, 1800928.

We claim:

1. A device for detecting an analyte in a sample suspected of containing the analyte, comprising:
   (a) a bio-functional nanostructured isoporous membranes (BNIM), and
   (b) an organic electrochemical transistor (OECT),
   wherein the OECT comprises:
      (i) a source electrode,
      (ii) a drain electrode,
      (iii) a channel, and
      (iv) a gate electrode,
   wherein the BNIM comprises a binding partner specific for the analyte and an isoporous surface further comprising a pore size distribution,
   wherein the source and drain electrodes are electrically connected by the channel, and
   wherein the BNIM is placed above the channel and in contact with the source and drain electrodes.

2. The device of claim 1, further comprising a supporting substrate, wherein the source electrode, the drain electrode, and the channel are patterned on the supporting substrate.

3. The device of claim 2, wherein the supporting substrate is selected from the group consisting of glass, silicon, paper, coated paper, resin-coated paper, paper laminates, paperboard, and corrugated board.

4. The device of claim 1, wherein the channel is made from a conducting polymer.

5. The device of claim 4, wherein the conducting polymer is selected from the group consisting of PEDOT:PSS, PEDOT-S, PEDOT:TOS, PEDOTOH:C10$_4$, PEDOT-co-PEDOTOH:C10$_4$, P3HT, PTHS, BBL, p(g2T-TT), PTHS-TMA$^+$-co-P3HT, p(gNDI-g2T), p(gOT2-g6T2), and P-90.

6. The device of claim 1, wherein the BNIM is made from a block copolymer poly (styrene-b-4-vinylpyridine).

7. The device of claim 1, wherein the binding partner specific for the analyte is smaller in size compared to the pore size distribution of the isoporous surface of the BNIM.

8. The device of claim 1, wherein the binding partner specific for the analyte comprises Congo Red or Thioflavin T.

9. The device of claim 1, wherein the binding partner specific for the analyte comprises an aptamer, optionally a peptide aptamer.

10. The device of claim 1, wherein the binding partner specific for the analyte is crosslinked to the isoporous surface of the BNIM.

11. The device of claim 1, wherein the gate electrode is not on contact with the source or drain electrodes.

12. A method of detecting the presence of an analyte in a sample comprising:
   (i) contacting an electrolyte solution of the sample with the device of claim 1,
   (ii) applying a drain voltage and a gate voltage, and
   (iii) measuring a drain current, a transconductance, and/or a response time,
   wherein a decrease in the drain current, a decrease in the transconductance, and/or an increased in the response time compared to those measured without the analyte indicates the presence of the analyte in the sample.

13. The method of claim 12, wherein the sample is a biological sample.

14. The method of claim 13, wherein the biological sample is selected from the group consisting of blood, serum, cerebrospinal fluid, and saliva.

15. The method of claim 12, wherein the BNIM of the device is interposed vertically, between the channel and the electrolyte solution.

16. The method of claim 12, wherein the binding partner specific for the analyte comprises Congo Red.

17. The method of claim 12, wherein the sample comprises or is suspected of comprising amyloid beta aggregates.

18. The method of claim 12, wherein the sample comprises a known concentration amyloid beta aggregates, the method further comprising generating a dose response curve.

19. The method of claim 12, comprising quantifying an amount of amyloid beta in the sample suspected of containing the amyloid beta by comparing the decrease in the drain current obtained as a result of binding of the amyloid beta in the sample suspected of containing the amyloid beta to Congo red of the binding partner specific for the analyte, to a dose response curve.

* * * * *